US008967463B1

(12) United States Patent
Billett et al.

(10) Patent No.: US 8,967,463 B1
(45) Date of Patent: Mar. 3, 2015

(54) AUTOMATED BANKING MACHINE THAT OPERATES RESPONSIVE TO DATA READ FROM DATA BEARING RECORDS

(71) Applicant: Diebold Self-Service Systems division of Diebold, Incorporated, North Canton, OH (US)

(72) Inventors: Nicholas Billett, Massillon, OH (US); Steven Shepley, Uniontown, OH (US); William R. Aitken, North Canton, OH (US); Glenda Griswold, North Canton, OH (US); Joseph McGinley, Pottstown, PA (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 97 days.

(21) Appl. No.: 13/828,305

(22) Filed: Mar. 14, 2013

Related U.S. Application Data

(60) Continuation of application No. 12/928,598, filed on Dec. 15, 2010, now Pat. No. 8,403,205, which is a continuation-in-part of application No. 11/493,979, filed on Jul. 27, 2006, now abandoned, and a continuation-in-part of application No. 12/583,886, filed on Aug. 27, 2009, now Pat. No. 8,123,122, which is a continuation of application No. 12/070,984, filed on Feb. 22, 2008, now Pat. No. 7,617,971, which is a division of application No. 11/504,478, filed on Aug.

(Continued)

(51) Int. Cl.
*G06Q 40/00* (2012.01)
*G07F 19/00* (2006.01)

(52) U.S. Cl.
CPC .................................... *G07F 19/201* (2013.01)
USPC .......................................... 235/379; 238/380

(58) Field of Classification Search
USPC ......... 235/379, 380, 382, 486, 487, 492, 383, 235/382.5
See application file for complete search history.

(56) References Cited

U.S. PATENT DOCUMENTS

| | | | |
|---|---|---|---|
| 6,151,643 | A | 11/2000 | Cheng et al. |
| 7,617,971 | B2 | 11/2009 | Shepley et al. |
| 7,891,552 | B2 | 2/2011 | Shepley et al. |
| 8,413,890 | B1 | 4/2013 | Billett et al. |
| 2005/0262498 | A1 | 11/2005 | Ferguson et al. |
| 2008/0110974 | A1 | 5/2008 | Shepley et al. |
| 2008/0156867 | A1 | 7/2008 | Shepley et al. |
| 2011/0106860 | A1 | 5/2011 | Wood et al. |

*Primary Examiner* — Thien M Le

(74) *Attorney, Agent, or Firm* — Black, McCuskey, Souers & Arbaugh, LPA

(57) ABSTRACT

Automated banking machines operate to cause financial transfers responsive to data read from data bearing records. Each of the automated banking machines includes a card reader that is operative to read data from user cards corresponding to financial accounts. Transactions are authorized responsive at least in part to correspondence between card data and stored data corresponding to authorized users. Entities responsible for operating the automated banking machines may receive messages that include information or update code items for software or firmware usable in the banking machines for which they have operational responsibility.

20 Claims, 34 Drawing Sheets

Related U.S. Application Data

15, 2006, now Pat. No. 7,334,723, which is a continuation of application No. 10/722,067, filed on Nov. 25, 2003, now Pat. No. 7,104,441.

(60) Provisional application No. 60/429,249, filed on Nov. 25, 2002, provisional application No. 60/429,476, filed on Nov. 26, 2002, provisional application No. 60/429,521, filed on Nov. 26, 2002, provisional application No. 60/429,528, filed on Nov. 26, 2002, provisional application No. 60/453,370, filed on Mar. 10, 2003, provisional application No. 60/465,733, filed on Apr. 25, 2003, provisional application No. 60/706,551, filed on Aug. 8, 2005, provisional application No. 60/706,592, filed on Aug. 8, 2005, provisional application No. 60/706,554, filed on Aug. 8, 2005.

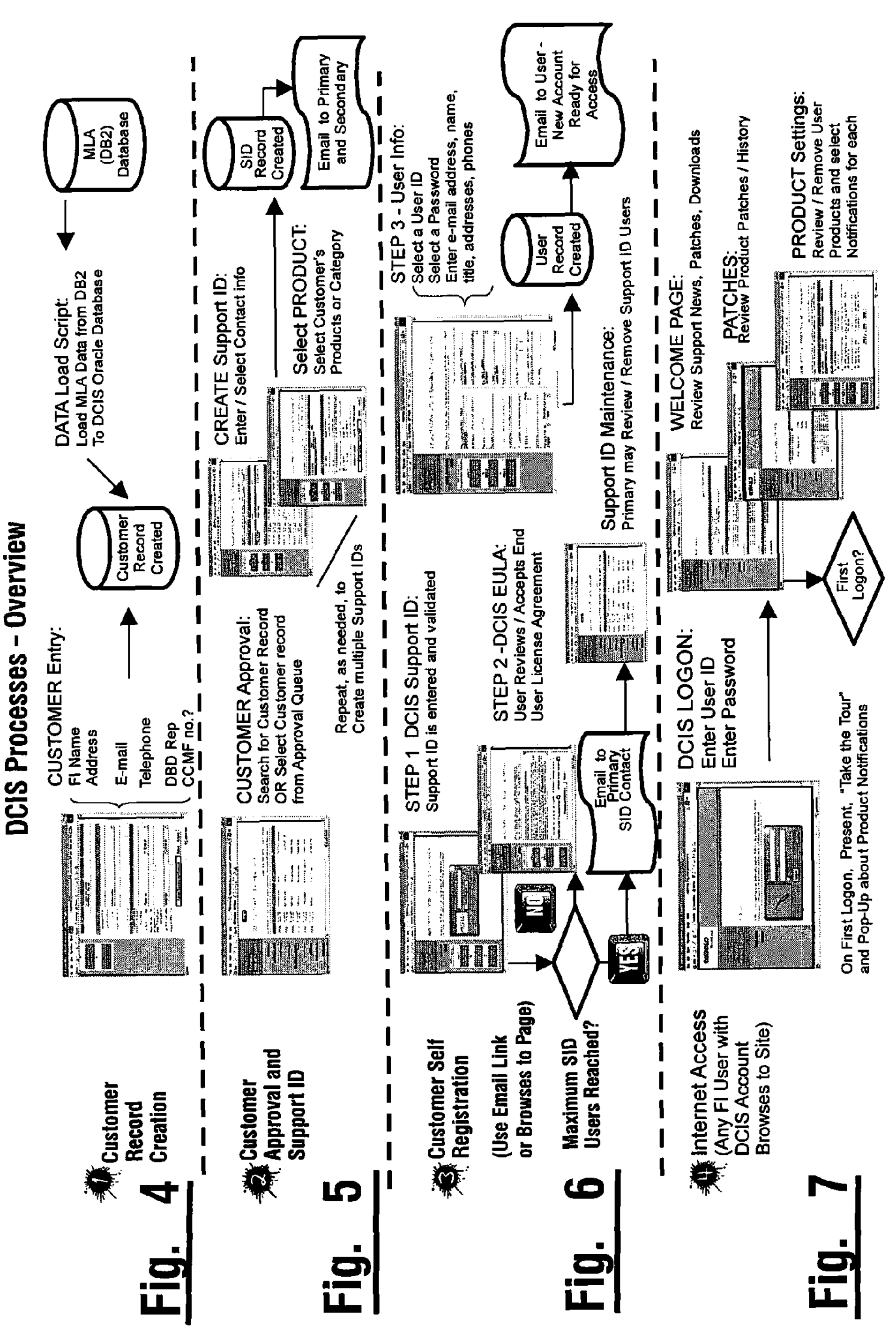
DCIS Processes - Overview
Fig. 4
1 Customer Record Creation
CUSTOMER Entry:
FI Name
Address
E-mail
Telephone
DBD Rep
CCMF no.?
Customer Record Created
DATA Load Script:
Load MLA Data from DB2
To DCIS Oracle Database
MLA (DB2) Database
Fig. 5
2 Customer Approval and Support ID
CUSTOMER Approval:
Search for Customer Record
OR Select Customer record
from Approval Queue
Repeat, as needed, to
Create multiple Support IDs
CREATE Support ID:
Enter / Select Contact info
Select PRODUCT:
Select Customer's
Products or Category
SID Record Created
Email to Primary and Secondary
Fig. 6
3 Customer Self Registration
(Use Email Link or Browses to Page)
Maximum SID Users Reached?
NO
YES
STEP 1 DCIS Support ID:
Support ID is entered and validated
STEP 2 -DCIS EULA:
User Reviews / Accepts End
User License Agreement
Email to Primary SID Contact
Support ID Maintenance:
Primary may Review / Remove Support ID Users
STEP 3 - User Info:
Select a User ID
Select a Password
Enter e-mail address, name,
title, addresses, phones
User Record Created
Email to User - New Account Ready for Access
Fig. 7
4 Internet Access
(Any FI User with
DCIS Account
Browses to Site)
On First Logon, Present, "Take the Tour"
and Pop-Up about Product Notifications
DCIS LOGON:
Enter User ID
Enter Password
First Logon?
WELCOME PAGE:
Review Support News, Patches, Downloads
PATCHES:
Review Product Patches / History
PRODUCT Settings:
Review / Remove User
Products and select
Notifications for each

156

160

182

188

192

Logon Page

Registration Step 1

Registration Step 2

234

Registration Step 3 g6065178 g6065220

Profile Section g6065221

Company Section

236

USER REGISTRATION CONFIRMATION g6065034

238 g6065035

LOGON PAGE

DCIS AGREEMENT

254 g6065140

256 g6065188

260 g6065056

MY PATCHES PAGES

PATCH DOWNLOAD

268 g6065053

AUTOMATED BANKING MACHINE THAT OPERATES RESPONSIVE TO DATA READ FROM DATA BEARING RECORDS

CROSS REFERENCE TO RELATED APPLICATIONS

This application is a continuation of U.S. application Ser. No. 12/928,598 filed Dec. 15, 2010. Application Ser. No. 12/928,598 is a continuation-in-part of U.S. application Ser. No. 12/583,886 filed Aug. 27, 2009, which is a continuation of U.S. application Ser. No. 12/070,984 filed Feb. 22, 2008 (now U.S. Pat. No. 7,617,971), which is a divisional of U.S. application Ser. No. 11/504,478 filed Aug. 15, 2006 (now U.S. Pat. No. 7,334,723), which is a continuation of U.S. application Ser. No. 10/722,067 filed Nov. 25, 2003 (now U.S. Pat. No. 7,104,441), which claims benefit pursuant to 35 U.S.C. §119(e) of Provisional Applications: 60/429,249 filed Nov. 25, 2002; 60/429,476 filed Nov. 26, 2002; 60/429,521 filed Nov. 26, 2002; 60/429,528 filed Nov. 26, 2002; 60/453,370 filed Mar. 10, 2003; and 60/465,733 filed Apr. 25, 2003.

Application Ser. No. 12/928,598 is also a continuation-in-part of U.S. application Ser. No. 11/493,979 filed Jul. 27, 2006, which claims benefit pursuant to 35 U.S.C. §119(e) of Provisional Applications 60/706,551; 60/706,592; and 60/706,554, each filed Aug. 8, 2005.

The disclosures of each of the foregoing Applications are herein incorporated by reference in their entirety as if fully rewritten herein.

TECHNICAL FIELD

This invention relates to automated banking machines that operate responsive to data read from data bearing records including user cards, and which may be classified in U.S. Class 235, Subclass 379.

BACKGROUND OF INVENTION

Automated banking machines may include a card reader that operates to read data from a bearer record such as a user card. Automated banking machines may operate to cause the data read from the card to be compared with other computer stored data related to the bearer or their financial accounts. The machine operates in response to the comparison determining that the bearer record corresponds to an authorized user, to carry out at least one transaction which may be operative to transfer value to or from at least one account. A record of the transaction is often printed through operation of the automated banking machine and provided to the user. Automated banking machines may be used to carry out transactions such as dispensing cash, the making of deposits, the transfer of funds between accounts and account balance inquiries. The types of banking transactions that may be carried out are determined by the capabilities of the particular banking machine and system, as well as the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin, or other transactions required by merchants. Still other types of automated banking machines may be used by service providers in a transaction environment such as at a bank to carry out financial transactions. Such transactions may include for example, the counting and storage of currency notes or other financial instrument sheets, and other types of transactions. For purposes of this disclosure an automated banking machine, automated transaction machine or an automated teller machine (ATM) shall be deemed to include any machine that may be used to automatically carry out transactions involving transfers of value.

Automated banking machines may benefit from improvements.

OBJECTS OF EXEMPLARY EMBODIMENTS

It is an object of an exemplary embodiment to provide an apparatus and system to facilitate the operation of automated banking machines.

It is a further object of an exemplary embodiment to provide a method for improving the operation of automated banking machines.

It is a further object of an exemplary embodiment to provide a system through which operators of automated banking machines may receive information about available items related to their machines.

It is a further object of an exemplary embodiment to provide a method by which persons who are responsible for operation of automated banking machines may receive information pertinent to their particular machines.

It is a further object of an exemplary embodiment to provide a system and method through which persons responsible for the operation of automated banking machines may receive information concerning available fixes, software patches or other items that may be available to improve the operation of the automated banking machines for which they are responsible.

It is a further object of an exemplary embodiment to provide a system and method through which persons responsible for the operation of automated banking machines may receive information and computer executable instructions that are pertinent to the automated banking machines for which they are responsible.

Further objects of exemplary embodiments will be made apparent in the following Detailed Description of Exemplary Embodiments and the appended claims.

The foregoing objects are accomplished in an exemplary embodiment by a system which includes at least one computer processor that is in operative connection with at least one data store which is alternatively referred to herein as a database. The computer processor is also in operative connection with at least one communications device which enables communication through at least one communication network. The at least one processor is also in operative connection with at least one input device such as a keyboard, mouse, touch screen or other device suitable for receiving inputs from a user.

In the exemplary embodiment the at least one data store includes data that corresponds to a plurality of entities that have operational responsibility for automated banking machines. These entities may include entities such as the owners of the machines, the entities who are responsible for servicing the machines, entities who operate the machines on an outsourced basis, network processors who are responsible for the operation of software on the machines, or other entities.

The exemplary data store further includes data corresponding to items of computer software that are operated by each of the respective entities in their automated banking machines. This may include for example operating system software, application software, driver software, communication software or other items of computer software. Alternatively and/or in addition the data store may include information concerning firmware revision levels on devices operated in automated banking machines. The data store may also include information about the different types of hardware devices operated in such automated banking machines.

The at least one data store includes information for each such entity information concerning how each such entity can be contacted through operation of the system. This may include for example contact information for particular individuals. Alternatively or in addition, in some embodiments contact information may include information necessary to communicate directly to one or more computers associated with the entity that can carry out necessary functions. In still other alternative embodiments the communication information may include direct communication with a particular machine that operates particular software or firmware.

In an exemplary embodiment the manufacturer of automated banking machines or other software or hardware pertinent to the operation thereof, includes information in the at least one data store that is pertinent to upgrades or updates to automated banking machines. This information may include for example, software changes, which are also referred to herein as "patches," that are desirable to apply to particular software when operated in particular machines. Such information may also include for example, firmware changes which are desirable to implement to avoid problem conditions. In still other embodiments such information may include information regarding changes or modifications to transaction function devices included in machines that are desirable to implement.

In an exemplary embodiment the at least one processor operates in response to data received through one or more input devices, to determine based on the data stored in the at least one data store, the entities responsible for operation of automated banking machines who may benefit from the receipt of such data. The at least one computer then operates in response to its programming to send the information to the entities who may benefit by acting on such information with regard to their automated banking machines. In some embodiments such communications may include e-mail messages to particular entities. Alternatively such messages may include providing such data to entities responsible for the machines when they log on the system. The system may operate to distribute such information in various ways depending on the urgency of providing the information.

In some embodiments the at least one computer may be in operative connection with at least one database from which certain desirable items may be accessed for delivery to entities responsible for the operation of automated banking machines. This may include for example, access to software patches which can be downloaded by an entity so that the patches can be installed on automated banking machines. Alternatively the system may provide entities with a link to a network address from which such software may be downloaded. In some embodiments the system may provide computer executable instructions for download that can be used to reprogram firmware in automated banking machines or to make other modifications that may be desirable.

In some embodiments the entities may receive such computer executable instructions in their respective computers. Such entities may then operate their computers to communicate the instructions to the automated banking machines for which they are responsible through one or more networks. In other embodiments the entities responsible for the machines may load such patches or other computer executable instructions onto media. This media may include for example floppy disks, CD-ROMs, DVDs, hard disks, thumb drives or other forms of computer readable media. Such media may then be taken to the banking machines and the instructions loaded thereon through the use of a disk drive or similar device at the machine. In still other embodiments such computer executable instructions may be loaded from the at least one processor through a network directly to a plurality of automated banking machines that may benefit from receiving the computer executable instructions.

Of course these approaches are exemplary and in other embodiments other approaches may be used.

BRIEF DESCRIPTION OF DRAWINGS

FIG. 4 is a schematic representation of a process for creation of customer records in an exemplary embodiment.

FIG. 5 is a schematic representation of a process for creation of customer support IDs in an exemplary embodiment.

FIG. 6 is a schematic representation of a process through which customers register to participate in a system of an exemplary embodiment.

FIG. 7 is a schematic representation of a process through which entities access the system of an exemplary embodiment to receive information concerning software updates and patches.

DETAILED DESCRIPTION OF EXEMPLARY EMBODIMENTS

Figure 1:
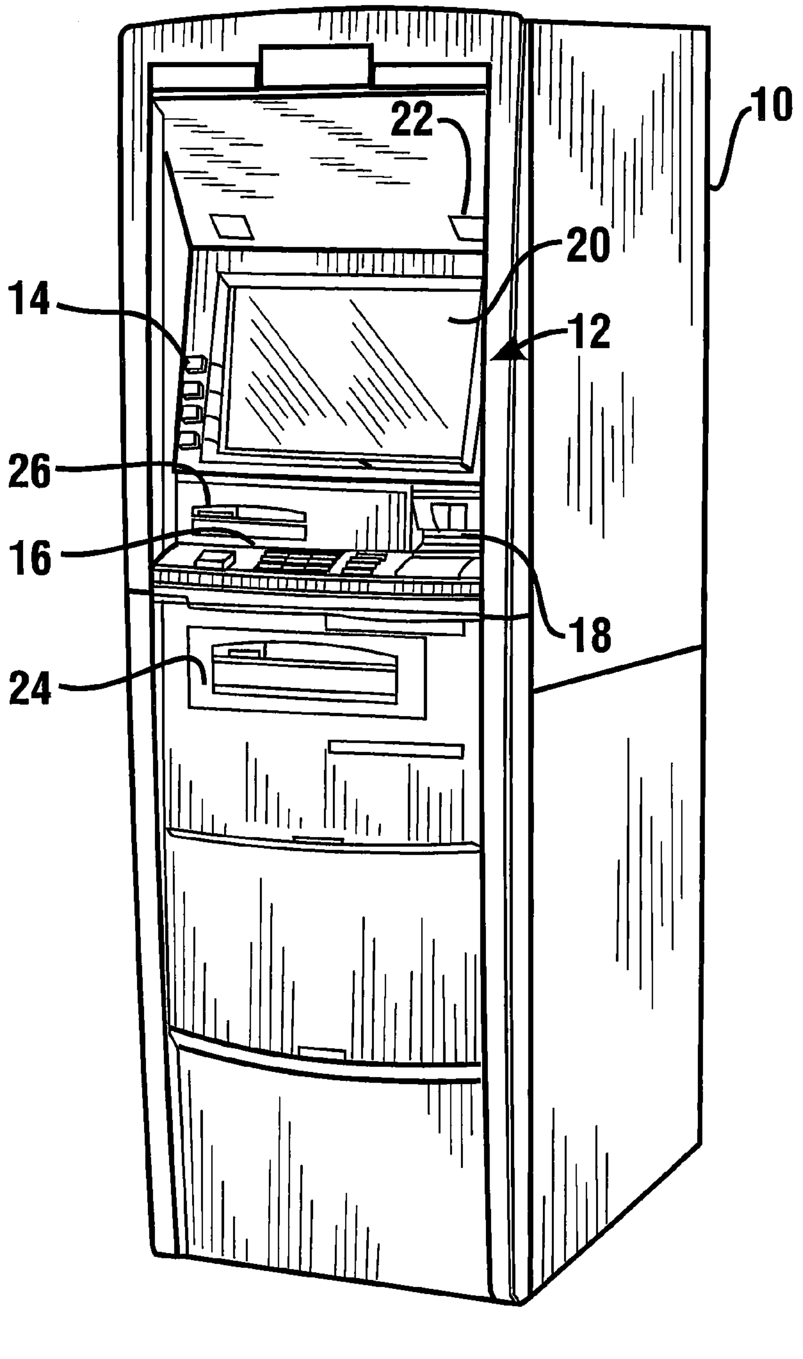
FIG. 1 is an isometric view of the exterior of an exemplary embodiment of an automated banking machine that operates responsive to data read from data bearing records.

Referring now to the drawings and particularly to FIG. 1, there is shown therein an exemplary embodiment of an automated banking machine generally indicated 10. The exemplary form of the automated banking machine is an ATM. The ATM includes a user interface generally indicated 12. The user interface includes input devices for receiving inputs from users as well as output devices for communicating outputs to users of the ATM. The ATM and associated systems may include features like those shown in U.S. patent application Ser. No. 12/584,491 filed Sep. 4, 2009 the disclosure of which is incorporated herein by reference in its entirety.

In the exemplary embodiment the user interface 12 includes input devices such as function keys 14 and a user keypad 16. Such input devices are used in the exemplary embodiment for receiving inputs such as instructions and characters, such as alphabetical characters and/or numerical values from users of the machine. The exemplary embodiment further includes a card reader 18 which operates to read indicia from a card input to the machine by users. In some embodiments the card reader may operate to read cards that include magnetic stripe or other data which corresponds to a user and/or a user's account. Other embodiments of ATMs may include other or different input devices such as a touch screen, microphone, camera, hand scanner, fingerprint reader, iris scanner or other devices that may be operated to receive inputs from users of a machine.

The exemplary embodiment includes output devices for providing outputs to users. Such output devices include a display 20. The display provides instructions and information to users operating the machine. The exemplary embodiment further includes speakers 22 which are operated to provide audible outputs to users of the machine. Other embodiments may include other or different output devices such as for example a headphone jack or other device for communicating with a personal listening device carried by a user. Alternative embodiments may also include output devices for communicating with cell phones, PDAs or other devices that may be operated by a user when conducting transactions. Still other embodiments may provide tactile or other outputs that can be perceived by a user as instructions or information related to operating a machine.

The exemplary ATM also includes other types of transaction function devices. These include a cash dispenser 24, the outlet of which is shown in FIG. 1. Another transaction device shown in the exemplary ATM, includes a receipt printer 26, the outlet of which is shown. The receipt printer may operate to provide printed receipts or other documents to users of the machine. Of course other embodiments may include different or other types of transaction function devices such as printers, depositories, imagers, communication devices or other devices that are appropriate for carrying out the types of transactions that are conducted through operation of the machine.

Figure 2:
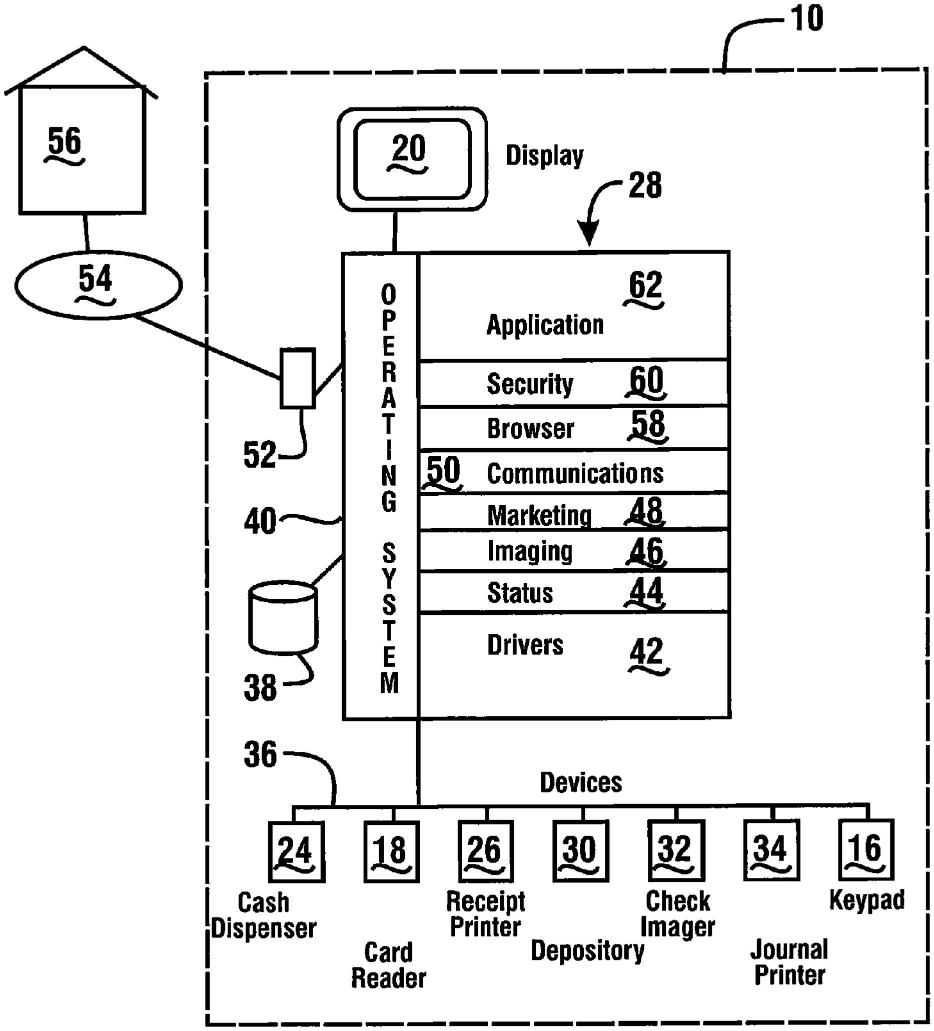
FIG. 2 is a schematic view of hardware and software components included in an automated banking machine, and a financial transaction network in which the machine communicates.

FIG. 2 shows schematically the components of an exemplary ATM 10. The ATM includes at least one computer 28 positioned therein. The at least one computer includes at least one processor alternatively referred to herein as a computer. The processor executes computer executable instructions which are programmed and stored in memory in the machine. The at least one computer operates the transaction function devices of the type previously discussed. These devices are shown schematically. For purposes of FIG. 2 some additional transaction function devices commonly found in ATMs and some others previously discussed have been omitted for purposes of brevity. Such additional transaction function devices commonly found in some ATMs include a depository 30. Such depositories are commonly included in or in conjunction with ATMs to receive envelope deposits or other types of deposit items. Another transaction function device schematically shown includes a check imager 32. Check imager 32 is operative to read and produce data corresponding to images of checks or other documents. Another exemplary transaction function device is a journal printer 34. Journal printer 34 is operative to print a paper record concerning transactions conducted at the ATM. A journal printer may be included to provide a hard copy record of transactions in the event that electronic information is lost or damaged.

In the exemplary embodiment the transaction function devices communicate with the at least one computer through a communications bus. The communications bus may be a proprietary communications methodology, published methodology conforming to a standard such as USB, or other suitable communications method. Of course it should be understood that provisions may be made for providing suitable forms of encryption or other protection for the communications which occur between the at least one computer 28 and the devices to minimize the risk of the security of the ATM being compromised.

As schematically represented in FIG. 2, the at least one computer 28 may operate to execute several different items of software. This software in addition to being executed by the at least one computer, is comprised of instructions stored in at least one data store schematically indicated 38. The at least one data store may comprise any one or more of suitable items for storing computer executable instructions. These may include for example, a hard disk drive, optical drive, solid state memory, DVD, CD-ROM or other article which is suitable for holding computer executable instructions. It should further be understood that the exemplary embodiment of the ATM includes a suitable device for loading computer executable instructions into memory. This may include for example, a disk drive, communications port or other suitable device through which computer executable instructions may be received and loaded into the one or more data stores 38 of the ATM.

The forms of software operated in the exemplary embodiment include an operating system 40. The operating system may be one or more of commercially available or proprietary types of operating systems. These may include for example, Microsoft Windows®, IBM OS/2, Linux or other suitable operating system type. Other forms of software which operate on the exemplary ATM include driver software 42. The exemplary driver software 42 is operative to communicate between the at least one computer and one or more transaction function devices. In the exemplary embodiment the driver software may include a collection of proprietary drivers with a proprietary interface. In other embodiments the driver software may include software which conforms to a published interface standard. Such a standard may include the CEN XFS interface standard which provides a standardized interface to other software. Of course other approaches may be used.

In the exemplary embodiment the at least one computer further operates software 44 which is operative to monitor the status of aspects of the ATM. Such status software may operate to monitor the status of devices and/or to monitor and coordinate device operation. In some embodiments the status software may operate to detect malfunctions or abnormal conditions with regard to the ATM and may cause the computer to communicate information concerning such conditions to ATM users or to remote systems or servicers. In still other embodiments status software may be operative to detect information that may suggest a future need to perform an activity at the ATM and report such information to servicers or a remote system. Of course these approaches are exemplary.

Other software operated in the exemplary embodiment includes imaging software 46. In the exemplary embodiment imaging software is operative to work in conjunction with a check imager 32 and to generate data corresponding to the visual appearance all or portions of checks or other documents that are input to the machine. In the exemplary embodiment the imaging software 46 may also be operative to analyze such image data for purposes of determining the nature of indicia that may be included therein. This may include for example analyzing visual indicia to determine numbers, letter or other characters that may be included on a check. This may include indicia which correspond to the legal or courtesy amount, characters in the micr line, check number, handwriting or signature data or other information that can be determined by computer analysis. In other exemplary embodiments the imaging software may also operate to analyze magnetic indicia on the check. This may include micr line data or other magnetic data that is on the check and determined through operation of a check imaging device. In still other embodiments the imaging software may be operative to detect potential irregularities in checks which may suggest possible check fraud. In still other embodiments the check imaging software may perform functions of controlling printer devices so as to cancel or otherwise render nonnegotiable input checks. In still other embodiments security features may be included to assure that check image data which is produced is tamper resistant. Of course additional or different functions may be included.

In the exemplary embodiment the at least one computer may operate marketing function software generally indicated 48. Such marketing software may be operative to provide marketing or other types of messages to operators of the machine. This may include for example, providing to users targeted marketing messages appropriate for the particular ATM user. In still other embodiments the marketing software may be operative to provide outputs from the machine that may be of particular interest to the particular user or to users generally. Such marketing software may operate in conjunction with other software and the computer to communicate with one or more remote systems which provide information concerning messages to be presented to users and which may also operate to fulfill user requests that may be input to the machine such as to follow through on a user's request to purchase a product or service that is offered through the machine. Of course these approaches are exemplary.

Another exemplary software component operating within the at least one computer 28 is communications software 50. The communications software is operative to enable the at least one computer 28 of the ATM to communicate with other devices and systems as is appropriate to carry out its functions. This may include the software necessary to provide the appropriate message formats and protocols to enable the ATM to communicate with remote systems. As shown in the exemplary embodiment, the communications software 50 works in conjunction with a communications device 52 to communicate to one or more networks 54. Network 54 is in operative connection with one or more banks, financial transaction processors or other suitable entities 56 to authorize transactions to be conducted at the machine. Of course it should be understood that in the exemplary embodiment of the ATM the transaction authorizing entity 56 would generally be a bank or financial transaction processor that operates one or more computers that can electronically debit or credit a user's account in response to transactions conducted at the machine. Of course it should be understood that numerous entities capable of carrying out different types of functions as appropriate for the capabilities of the machine, may be in communication with the machine through appropriate network support communications devices. Communications devices 52 may include one or more network communication cards, modems or other suitable communications interfaces between the at least one computer and the networks in which the ATM communicates.

Other software components operating in the at least one computer 28 include browser software 58. Browser software 58 is operative to process instructions included in markup language documents such as HTML, XML or other HTTP records that may be received or generated by the machine. Such browser software may include for example Microsoft Internet Explorer™, Mozilla Firefox™ or other type of browser software that can interpret the instructions included in such markup language documents or messages. In the exemplary embodiment the browser software is operative to cause the computer to provide outputs that are included in visual outputs produced by the display 20. Such browser software may also operate to provide outputs of the audible type through the speakers 22. In some embodiments the browser software may also be operative to interpret transaction device instructions included in markup language documents such as those that comply with the Interactive Financial eXchange (IFX) standard. Such instructions may be operative to cause transaction function devices to operate. Of course these approaches are exemplary and in other embodiments other approaches may be used.

The exemplary software components further include security software 60. Security software 60 is operative to reduce the risk that unauthorized activities will be carried out through operation of the ATM. Such security software may include for example, firewall software which is operative to limit the nature of the communications that may be carried out with the ATM in the course of conducting transactions. Such security software may limit the addresses with which the ATM can communicate in carrying out certain types of transactions. The security software may also analyze the types of messages that are provided by or received at the ATM. Such software may then operate in accordance with its programmed logic to limit or refuse the carrying out of transactions in response to such instructions. In other exemplary embodiments the security software may operate to monitor and control communications internally within the ATM. This may include for example providing security for communications between various transaction function devices and the at least one computer. The security software may also in some embodiments look for certain conditions or sequences of conditions which suggest improper activity. The security software may also cause the ATM to report suspicious activities to servicers in response to inputs to the machine and/or automatically to remote systems. Of course these approaches are exemplary.

The exemplary at least one computer 28 also operates an application software component 62. The application software component generally controls the overall operation of the devices in the machine in response to messages received by the ATM. Such application software may in some embodiments include a dedicated proprietary application. Examples of such applications are Diebold® TCS and TCS Plus. Such applications are only suitable for operating a particular type and/or model of ATM. In other embodiments the application may be a cross-platform software application. An example of such a cross-platform software application is Diebold® Agilis 91x. Such cross-platform software is capable of operating on numerous brands and models of ATMs. Application software may include computer executable instructions to carry out various ATM functions and transactions.

The software components shown as operating in the at least one computer 28 of the ATM 10 are exemplary. It should be understood that numerous other types of software may be operated in such a computer in order to carry out particular types of operations and transaction functions. It should further be understood that generally the type and character of software which operates in an ATM computer is dictated both by the type of machine as well as the entity responsible for its operation. Entities which operate ATMs may install numerous types of software on their ATM machines to facilitate their operations. Such software may come from numerous different sources. Further the ATM manufacturer may operate as a systems integrator and include various types of software which it acquires from third parties on its ATMs as either standard or optional features which its customers can acquire.

As can be appreciated, in ATM systems and particularly those that include numerous types of transaction function devices and software, there is the frequent opportunity to install changed versions of such items. For example it is not uncommon for a software provider such as Microsoft to make available various forms of fixes or patches to its Windows® operating system software. Such fixes and patches may address deficiencies in performance or security of the Windows® operating system. It is often desirable for users to install such fixes or patches in order to be assured of the secure operation of the Windows® software. Other items distributed by software manufacturers may include upgrades or performance enhancements to software. Often such performance enhancements are also associated with fixing possible bugs or security deficiencies.

It is not uncommon for ATM manufacturers or the entities from which they acquire components to have new features or improvements available for the operation of the respective devices. For example deficiencies are sometimes found in the device resident firmware code that operates devices. Often it is desirable to change the firmware or to reprogram the appropriate onboard chip memory with a new program so as to fix a possible deficiency and avoid a potential cause for malfunction. Alternatively it may be appropriate to change such programming to that the particular device can work in conjunction with other devices or software.

Likewise hardware devices may have a need for changes to fix deficiencies or improve performance. Such changes may include changes in parts or to install upgrades related to a particular module or machine.

Entities having operational responsibility for ATMs may have previously encountered difficulty in becoming aware of the availability of changes or modifications to software, hardware and/or firmware that they may be using in their automated banking machines or other devices. In many cases such entities who are responsible for the operation of automated banking machines may operate networks that include many different types of machines which include numerous different types of software and transaction function devices. Users often have not been able to determine from information concerning the availability of a particular change whether it is applicable to their machines. Further complicating the situation for some entities who have operational responsibility for ATMs, is the fact that while ATMs may operate a version of a commercially available product, such as for example a Microsoft® Windows® operating system, the version of the product used in a particular ATM may be customized for use in the particular ATM application. As a result when the developer of such a product makes available a particular patch or upgrade, such item may or may not work satisfactorily on an ATM. Indeed in some cases the installation of a change provided by the manufacturer of a product not produced for use in an ATM, may cause a malfunction or security defects when installed on an ATM.

Figure 3:
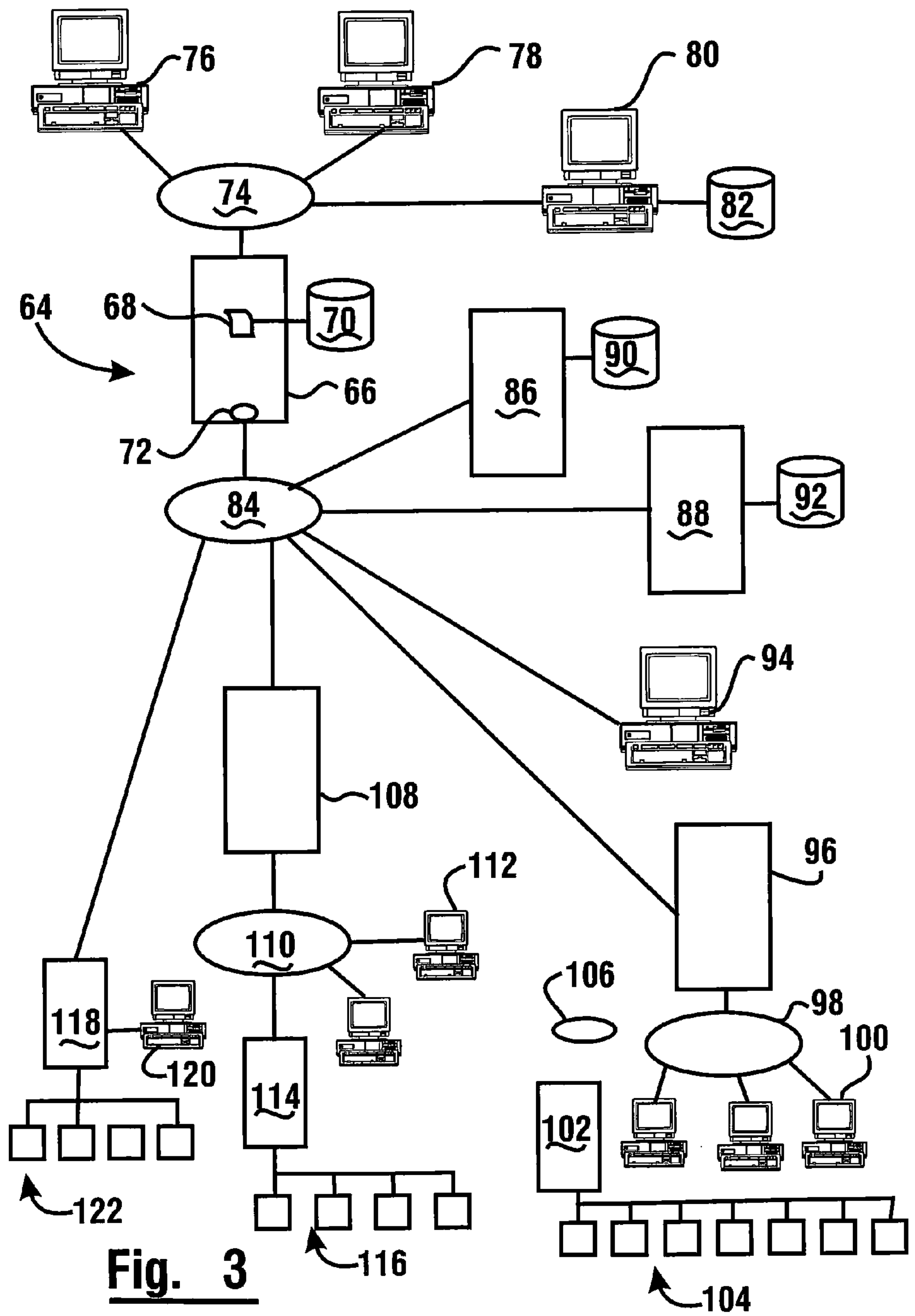
FIG. 3 is a schematic view of a network configuration of an exemplary embodiment of a system for communicating information regarding automated banking machines.

FIG. 3 is a schematic view of an exemplary system which can be used to advise entities having operational responsibility for automated banking machines, of information about available changes applicable to their machine. In some embodiments such system may be used to deliver update code items that can be used to change programming on the ATMs for which system users have operational responsibility. System 64 includes one or more servers 66. Servers 66 include at least one processor 68 for executing instructions. Processor 68 is in operative connection with at least one data store 70. Data store 70 includes computer executable instructions as well as one or more databases of information applicable to the operation of automated banking machines which may be of the type later discussed. Server 66 includes at least one communication device 72 for enabling the server to communicate in one or more networks.

In the exemplary embodiment shown, the at least one server 66 communicates with a first network 74. Network 74 is in operative communication with workstations 76, 78 and 80. Each of the workstations of the exemplary embodiment include at least one input device, at least one output device, at least one processor and at least one data store. In the exemplary embodiment workstations 76, 78 and 80 are used for providing inputs of information related to the operation of automated banking machines. This information is communicated to and used by the at least one server. Of course it should be understood that network 74 and these workstations may also communicate with other systems and databases such as database 82 which is schematically shown. Further, in exemplary embodiments, numerous workstations, other systems, input devices and networks may be operative to provide instructions and data that is used in conjunction with one or more servers 66.

In the exemplary embodiment, one or more servers 66 may be in operative connection with one or more networks 84. Network 84 in exemplary embodiments may be a network that is publicly accessible such as the World Wide Web which is alternatively referred to herein as the Internet. Alternatively in other embodiments network 84 may include one or more wide area networks or local area networks which can be accessed and used in a manner as later discussed.

In the exemplary embodiment network 84 may include a wide area network that is in communication with remote servers 86 and 88. Servers 86 and 88 are in operative communication with respective data stores 90 and 92. In the exemplary embodiment servers 86 and 88 may include sources from which information about update code items such as software or firmware patches can be obtained. In addition such servers may include programming which enables a user to download such update code items through the network 84. This enables for example, the linking through the network 84 to a server that may be operated by the provider of a particular software item. This may be for example, Microsoft in the case of Microsoft® Windows®. This may then enable a user whose workstation is connected to the network as well as the server 66 to obtain information about update code items that may be applicable to Windows® software. This may include security patches or other items that are desirable to use in conjunction with Windows® software. In addition in some embodiments the server may provide the capability of delivering the update code item directly to another computer through the network 84 as later discussed.

In the exemplary system 64, network 84 may be accessed by workstations such as workstation 94. Such a workstation 94 may be operated in the exemplary embodiment by an entity which has operational responsibilities for automated banking machines. Likewise a server 96 may be in operative connection with the network 84. Server 96 may provide access to the network 84 from a private network 98 which has in connection therewith workstations 100. Workstations 100 may be associated with individuals who have operational responsibility for automated banking machines. As later discussed the workstations 100 may be operated by individuals to receive information concerning available changes to automated banking machines that are applicable to the machines operated by the particular entity. Persons responsible for operating such workstations may then receive such information and act in response thereto. This may include for example deploying update code changes such as software or firmware patches and fixes on the pertinent ATMs for which the persons who operate the workstations or their employer have operational responsibility.

A network is represented in FIG. 3 by a host computer 102 which is connected to a plurality of automated banking machines 104. In such a system which is associated with the particular entity having operational responsibility for the ATMs 104, users working for the entity may receive update code items that for example are applicable to a software item that is operated on the ATMs 104, through the use of the workstations 100. Such update code items may be downloaded through the workstation and placed on media such as CD-ROMs, DVDs, solid state memory or other articles schematically represented 106. The computer executable instructions included on the article 106 may then be loaded to the host 102 and then deployed electronically to each of the automated banking machines 104. Alternatively such update code items may be later loaded from such an article to the memory of each of the automated banking machines 104. In this way as later discussed update code items applicable to ATMs such as software or firmware patches and fixes, can be deployed by an entity having operational responsibility for the ATMs onto the particular machines to which such changes are pertinent.

FIG. 3 also shows network 84 in operative connection with a server 108. Server 108 is associated with an entity having operational responsibility for automated banking machines and is in operative connection with a network 110. Network 110 is in operative connection with workstations 112. Workstations 112 may also be operated to determine update code items or other information that is pertinent to ATMs for which the entity has operational responsibility. Such an entity may also choose to communicate update code items for software or firmware through the network 110 to a host 114 which may then operate to electronically deploy such update code items to a plurality of ATMs 116. In such an exemplary embodiment a user having operational responsibility for the ATMs may receive update code items from the server 66 or by linking to other servers such as servers 86 and 88. This may be done by sending a message to a user including a hyperlink which is also referred to herein as a link. Such a user may then choose to deploy such update code items to its ATMs 116 through operation of server 108 and host 114.

Also represented in FIG. 3 is a server 118 which is in operative connection with network 84. Server 118 is in operative connection with at least one workstation 120. Server 118 operates as a host that communicates with and causes automated banking machines 122 to perform financial transactions. A user having operational responsibility for the banking machines 122 can cause the server 118 to obtain update code items pertinent to the banking machines and to deploy such update code items to the machines. Once the update code items are applied to the programs on the ATMs, the ATMs can be operated to carry out transactions including the dispense of cash and other functions. Of course the configurations shown in FIG. 3 are exemplary and in other embodiments other approaches may be used.

In an exemplary embodiment an entity such as an ATM manufacturer operates as a coordination entity to determine information about updates and changes that are pertinent to particular ATM models and/or types. This may include for example the particular manufacturer's ATMs. The entity then collects information that is pertinent to the software, firmware and devices that are included in its ATMs. This includes for example information about changes and patches that are pertinent to software that are known to be deployed on its ATMs. This may include changes to the ATM manufacturer's own developed software. Alternatively or in addition it may include software that comes from third parties and the changes to which are under the control of such third parties. This may include for example operating system software such as Microsoft Windows for which there are frequent patches and security changes. It may also include the other types of software such as those previously discussed for which the various providers make available patches or other changes.

In some exemplary embodiments in which the ATM manufacturer acts as a coordination entity, the manufacturer may also determine changes related to ATM devices and firmware. This may include changes necessary to correct possible bugs or deficiencies in firmware developed by the particular ATM manufacturer. Alternatively or in addition it may include changes to firmware that are under the control of the manufacturer of the particular device that is included in the ATM. For example the ATM manufacturer may include in the ATM a particular type of printer that is produced by a printer manufacturer. The printer manufacturer may provide the ATM manufacturer with information about deficiencies in its firmware and/or changes to firmware or hardware that are desirable to maintain reliable operation of the printer.

In an exemplary embodiment the coordination entity which is the manufacturer, receives this information from various sources and determines through analysis or other measures which of these items of information and/or update code items such as patches or other changes may be appropriate for users of the applicable automated banking machines. As previously discussed, in some cases the security measures, devices employed or other architectural features included within the ATMs of interest may make the deployment of such update code items or other changes inappropriate or actually detrimental to the operational function of certain ATMs. The ATM manufacturer in this exemplary embodiment determines which changes and update code items may be pertinent to users of its machines. Such a manufacturer may then make such information and update code items available to its users through the exemplary processes described in connection with FIGS. 4 through 39.

For the sake of brevity, the exemplary system will be described with reference to making users aware of update code items which for purposes of this description comprise changed versions of software and/or firmware used in ATMs. It should be understood, however, that the principals described are also applicable to making users aware of other changes or items that are pertinent to the entity having operational responsibility for the ATMs.

FIG. 4 shows schematically an initial exemplary process associated with the creation of customer records which are included in a database. This database would be included as part of the one or more data stores 70 that are in operative connection with the one or more servers 66 previously discussed. As represented in FIG. 4 the process is carried out in an exemplary embodiment through a system that is referred to as DCIS. DCIS refers to "Diebold Customer Internet Support" which is the name of the system and operational function carried out by the assignee of the present application in connection with the exemplary processes described. The use of the DCIS terminology shall in no way operate to limit the scope of the processes and apparatus described herein or the scope of the claims associated therewith.

As shown in FIG. 4 a customer record may be created through inputs to one of the workstations 76, 78 or 80. The pertinent information may include information such as the name of the customer entity having operational responsibility for ATMs such as the financial institution ("FI"). It may also include other pertinent information such as the address of the customer. It may also include contact information for the particular entity such as the e-mail address or telephone number of a particular person to be contacted at the entity. It may also include the names of the manufacturer's representative who is responsible for that customer and other identifying information such as a customer number. Storage of such information in at least one data store in the exemplary embodiment enables a salesperson and/or other persons associated with the ATM manufacturer who operates the system, to be notified when customer entities for which they are responsible receive notifications from the system.

Alternatively as shown in FIG. 4 rather than input the information directly into a workstation such information may be gathered from a database of license agreements that customers have signed related to software that they operate. This is represented by the "MLA" database shown in FIG. 4. Information may be abstracted from or manually input based on license data which provides information concerning the particular customer, contact and other information that would be pertinent to an entity having operational responsibility for automated banking machines. More detailed processes associated with the creation of a customer record are shown schematically in FIG. 8.

Figure 8:
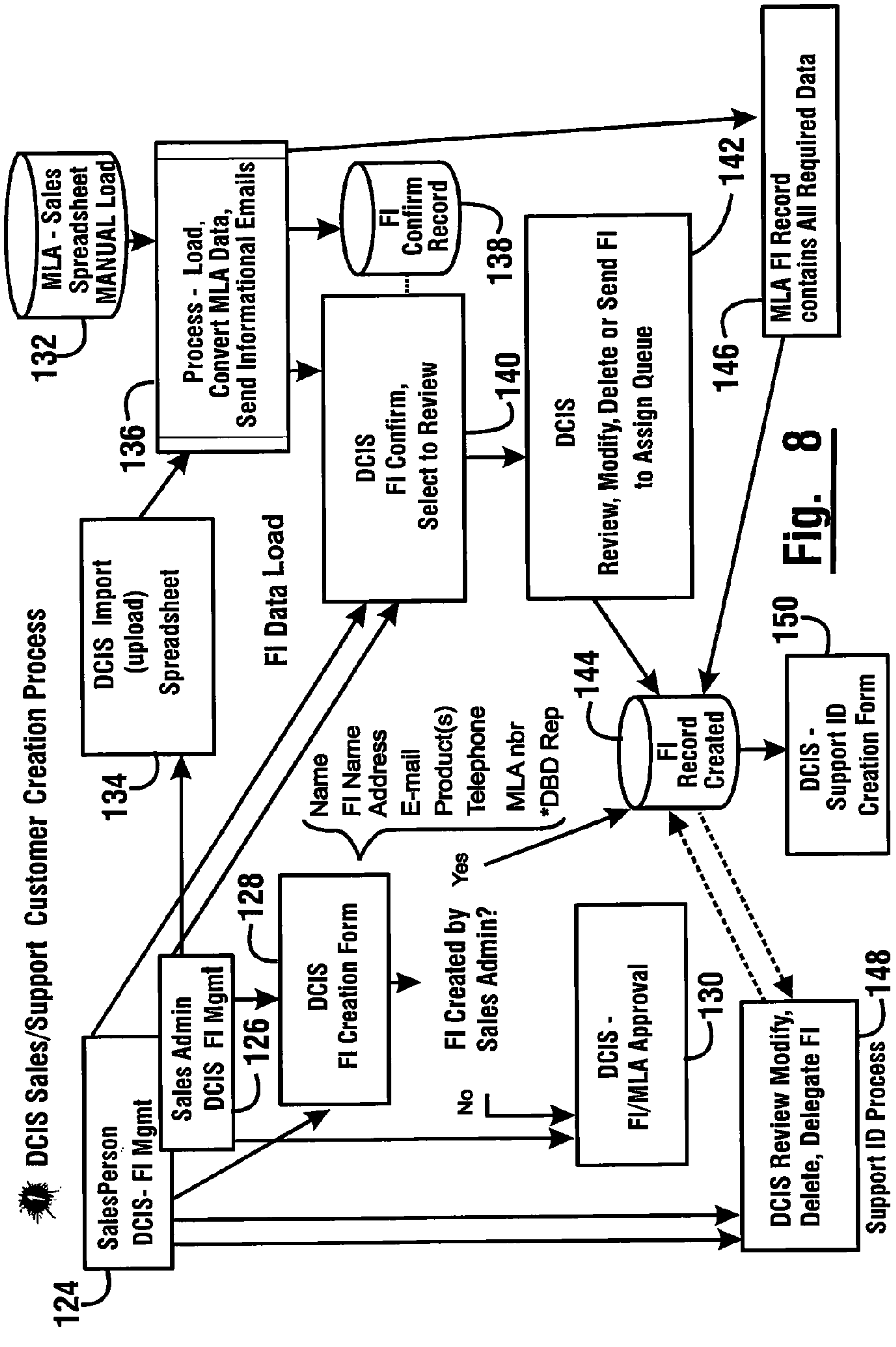
FIG. 8 is a schematic representation of processes associated with the creation of a customer record associated with a user of an exemplary system.

As shown in the upper left portion of FIG. 8 and is represented by a function box 124, a salesperson may input the data previously discussed that is included in the customer record. Alternatively such a record may be created by a sales administration person inputting such data. This is represented by a function box 126. The input of the data is represented in FIG. 8 by the function box 128. Associated with function box 128 are also the various items of information that it is desirable to include in the particular customer record. This includes the items previously discussed as well as certain other items. Inputs may include information concerning the particular ATM products that the customer operates. This may include ATM model numbers or alternatively or in addition may include the particular software products, modules or other information that is pertinent to determining what information and update code items the customer should receive. Of course additional information may be included such as the customer's license number or other pertinent information that may be useful to operation of the system.

As also represented in FIG. 8, provision is made to verify via a sales administration function the information in the record when the record was not input by the administration function. This is represented by a function box 130. Alternatively information for the creation of customer record may come from a data store including information concerning customers who have signed license agreements as represented by a data store 132. Data from that data store may be abstracted into a spreadsheet by a sales administration function or may otherwise be electronically processed so as to abstract pertinent information from the license agreement. The generation and provision of spreadsheet information is represented by a function box 134 and the abstracting of data from license forms is represented by a function box 136.

When data is abstracted it may be appropriate to verify the accuracy of the data which is abstracted. The abstracted data is represented as stored in a data store 138 and is then analyzed for accuracy along with other data, by sales administration or sales personnel as represented by a function box 140. Upon appropriate review, modification or deletion of the data as represented in a function box 142, the customer record is finalized and stored in a data store 144. It should be understood as represented by function box 146 that in some embodiments the necessary data may be abstracted from license agreements and the license agreement alone made the source of all necessary data for the customer record. Further as represented by function box 148 once a customer record has been created, it is subject to being modified, corrected or updated by sales administration, sales technical or other appropriate personnel who are authorized to do so in accordance with the programming of the system. Once the customer record is finalized it is then utilized as represented in a function box 150, for purposes of creating a customer support ID.

Figure 9:
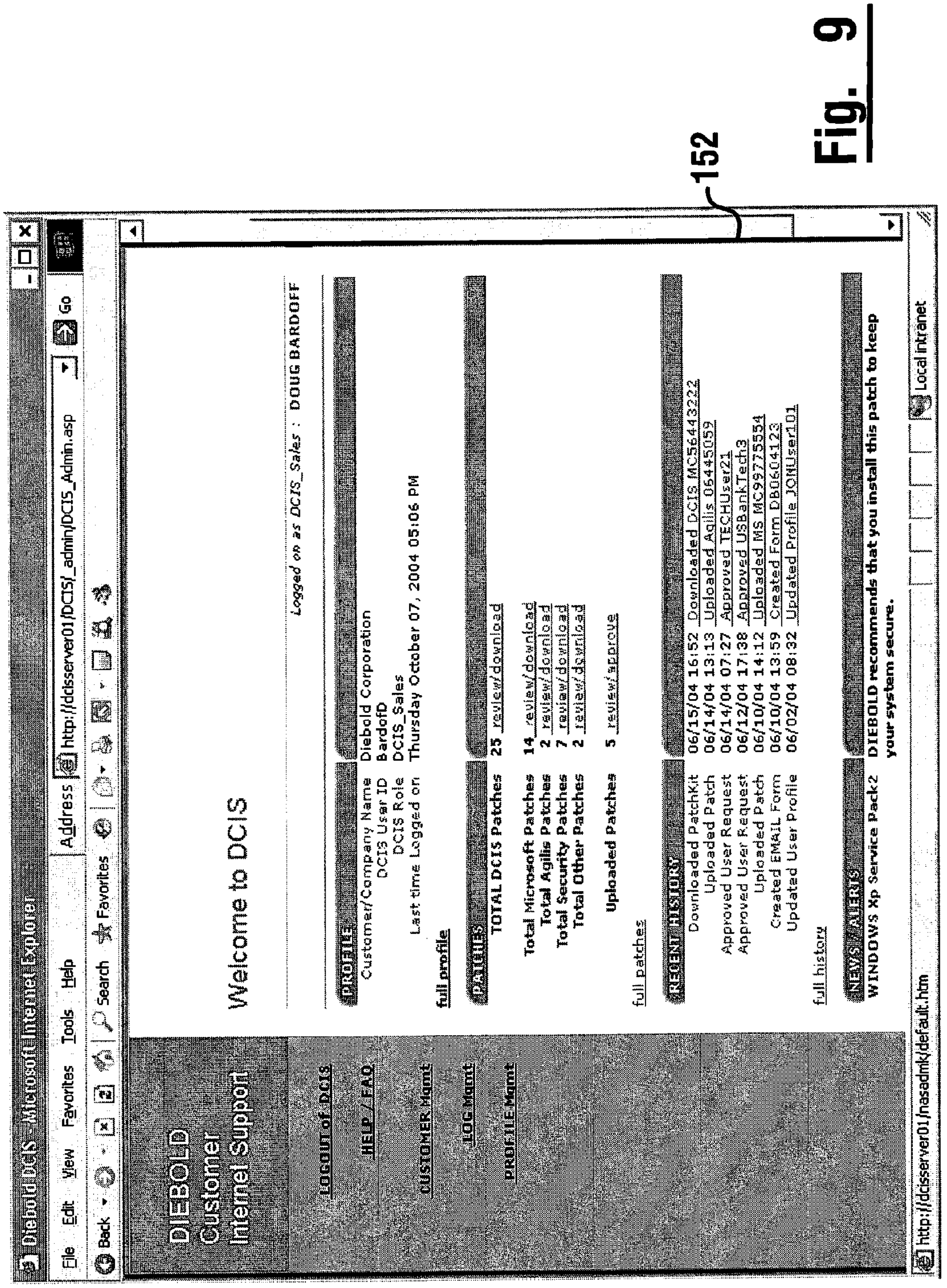
FIG. 9 is an exemplary display output associated with the creation of a user record.

FIGS. 9 through 14 show screens that may be output through displays of workstations such as workstation 76, 78 and 80 used by various personnel in the creation of the customer record. FIG. 9 shows a screen 152 which is a welcome screen for an authorized ATM salesperson who uses the system to input and receive information. As can be appreciated the welcome screen includes information about the person as well as other data that may be associated with the particular person. This may include information concerning the download of software patches by customers for which the particular sales user is responsible. Alternatively or in addition alerts may be presented which show particular actions which the customers for which the salesperson is responsible may wish to take. In addition the exemplary welcome screen 152 includes options for further functions which the user may select.

Figure 10:
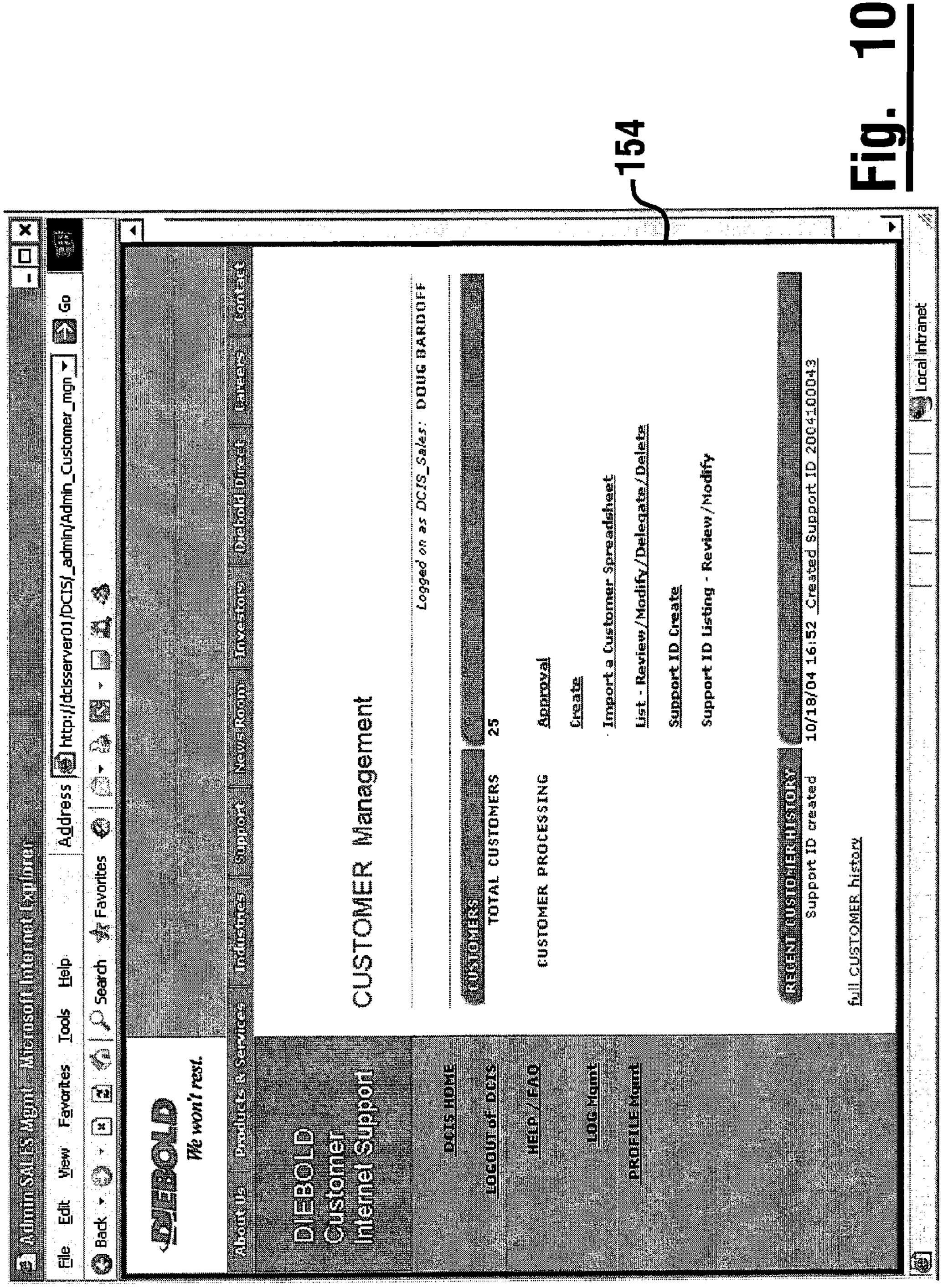
FIG. 10 is a further exemplary display output associated with creation of a user record.

Screen 154 shown in FIG. 10 is associated with customer management functions that the particular salesperson may perform. Of course as can be appreciated these may vary depending on the particular role and system authorizations granted to the salesperson. In this exemplary embodiment for this particular individual the system is programmed to enable the user to provide customer data; create a new customer record; import spreadsheet data; review, modify, delegate or delete customer data; create support IDs; and/or to review or modify support ID listings. It should be understood that these functions are exemplary and in other embodiments other approaches may be used.

Figure 11:
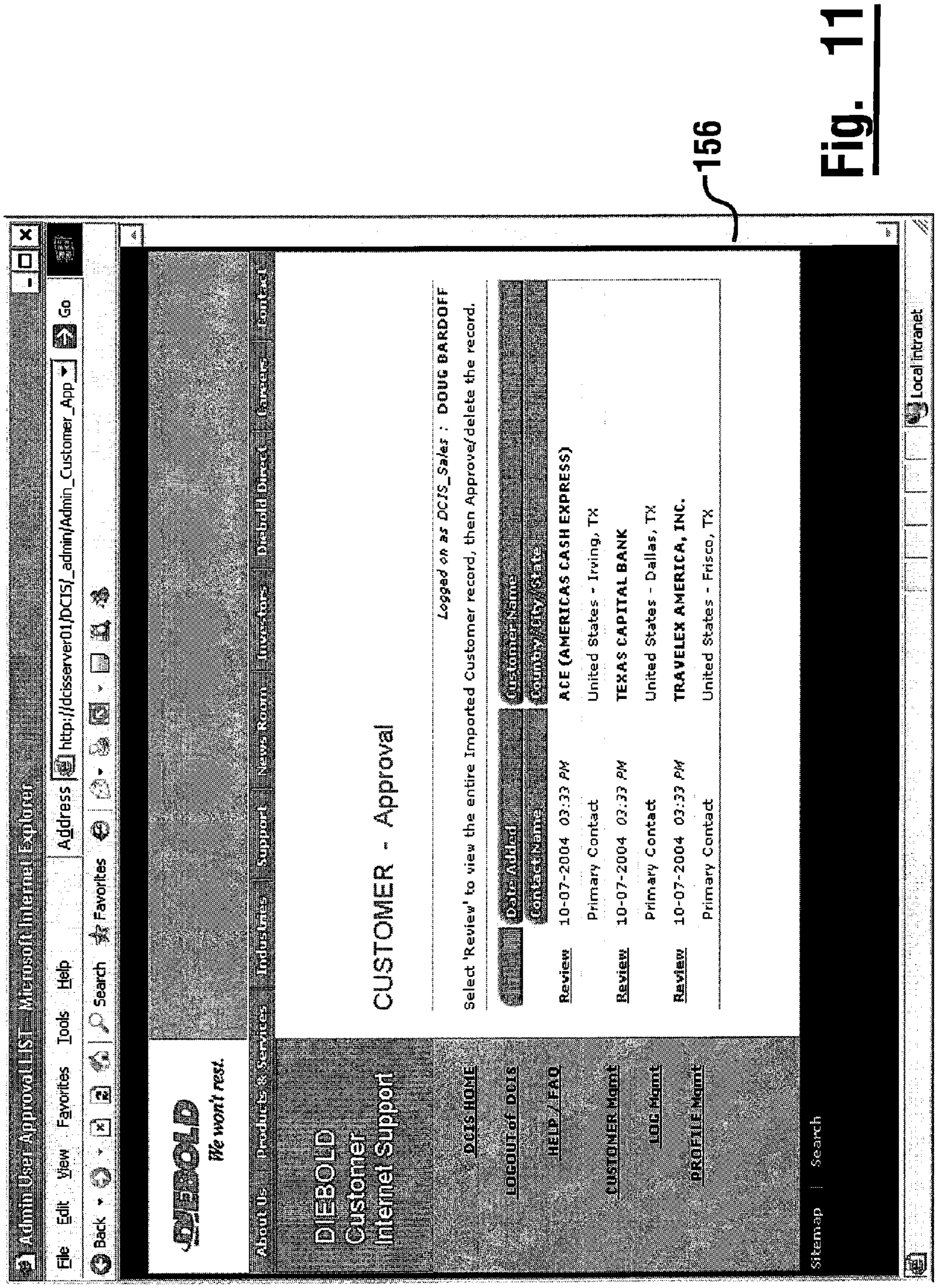
FIG. 11 is a further exemplary display output associated with creation of a user record.

FIG. 11 shows a display screen 156 output from a workstation that corresponds to the customer approval function. In this case the particular user is authorized to approve the inclusion of particular customers in the system. Selecting this option causes a list of customers over which the individual has approval responsibility to appear on the screen. Selecting the particular customer enables the user to input or modify information to be included in the customer record concerning such a customer.

Figure 12:
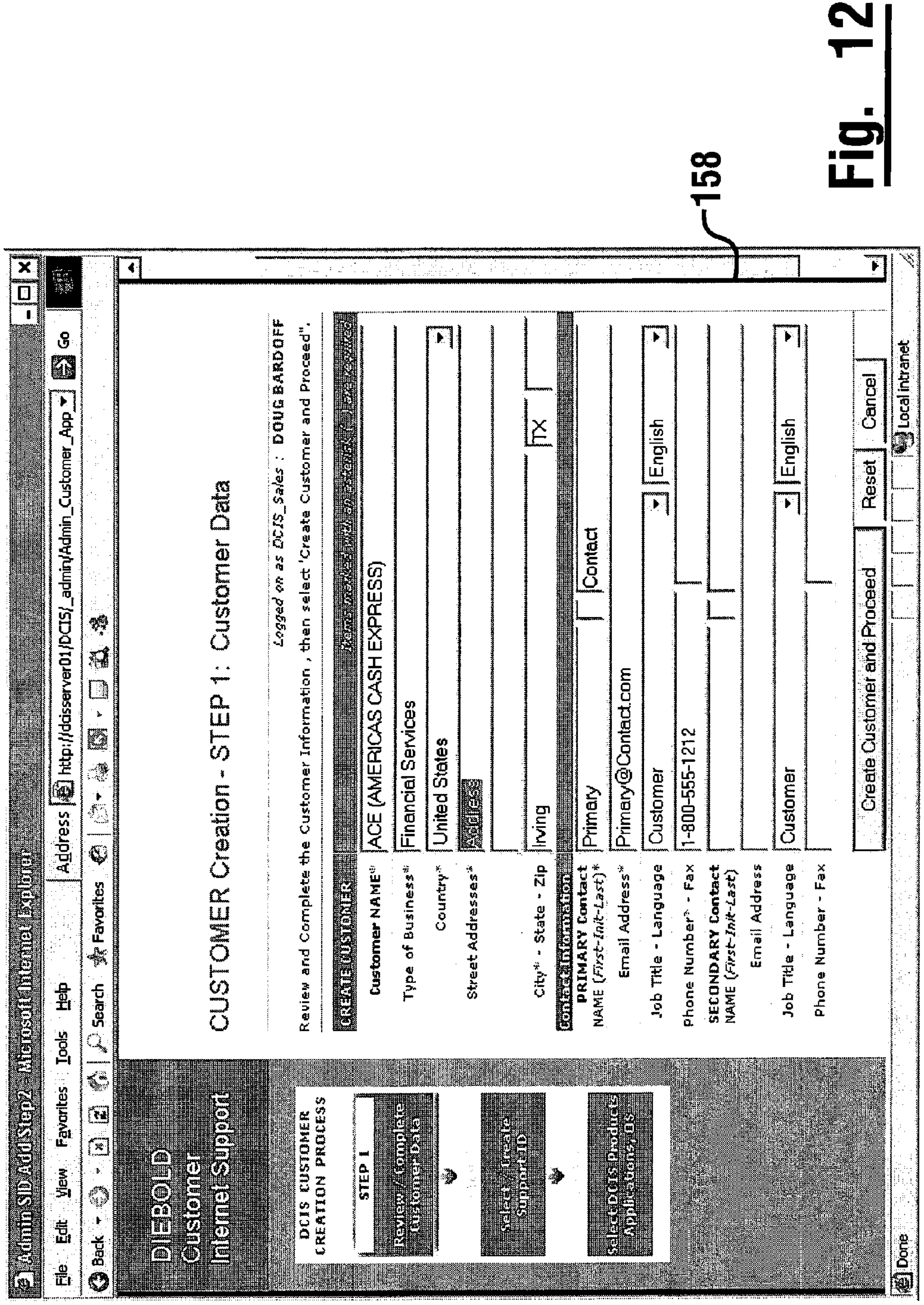
FIG. 12 is a further exemplary display output associated with creation of a user record.
Figure 13:
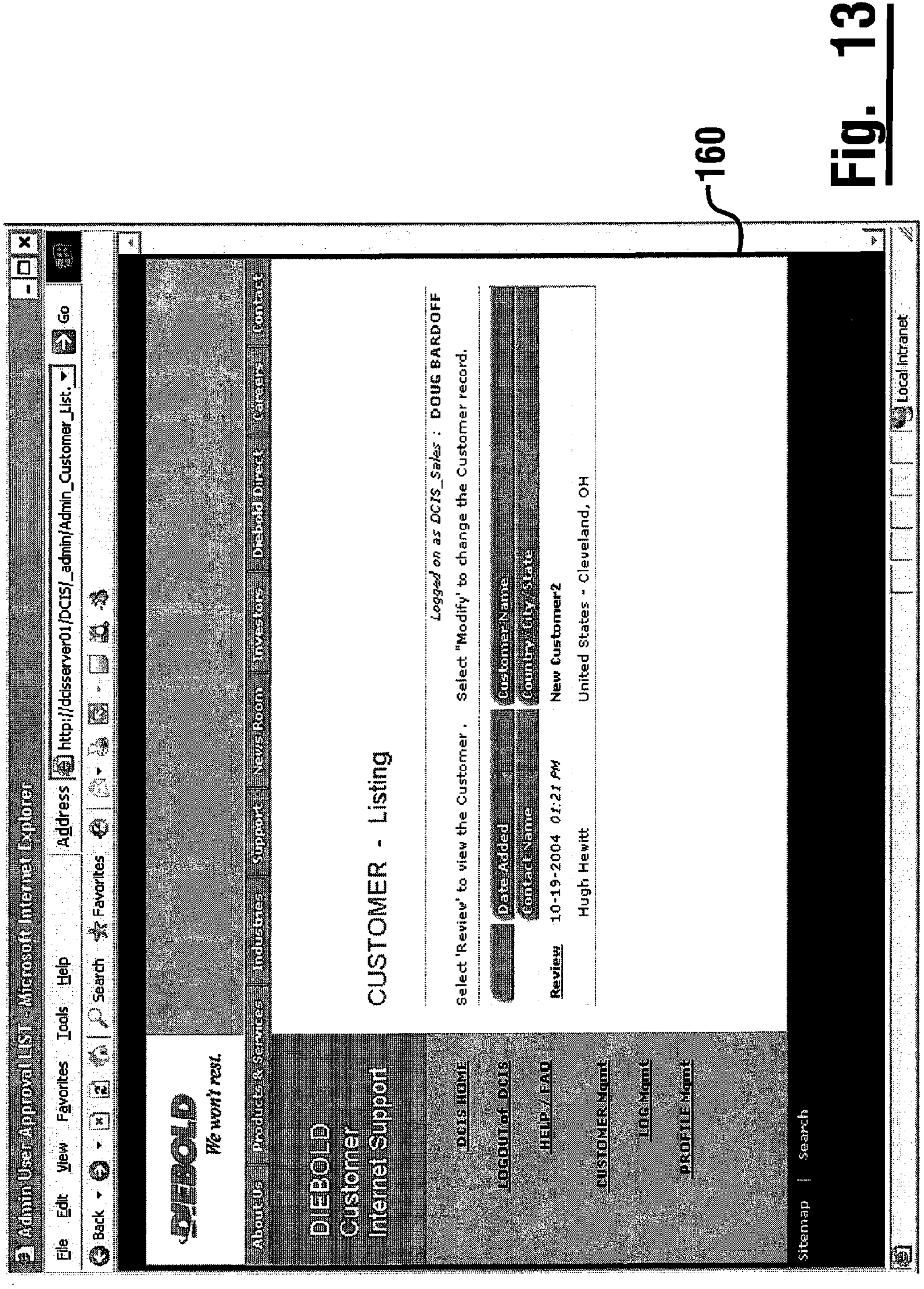
FIG. 13 is a further exemplary display output associated with creation of a user record.

FIG. 12 shows a screen 158 that is associated with the input of data concerning a particular customer. An authorised user is enabled to input or modify the data of the type previously discussed. The system also enables a user to select to review or to modify previously input data as represented in a screen 160 shown in FIG. 13. Such a screen may be output through a workstation as part of the review and approval processes prior to the creation of a support ID for the particular customer.

Figure 14:
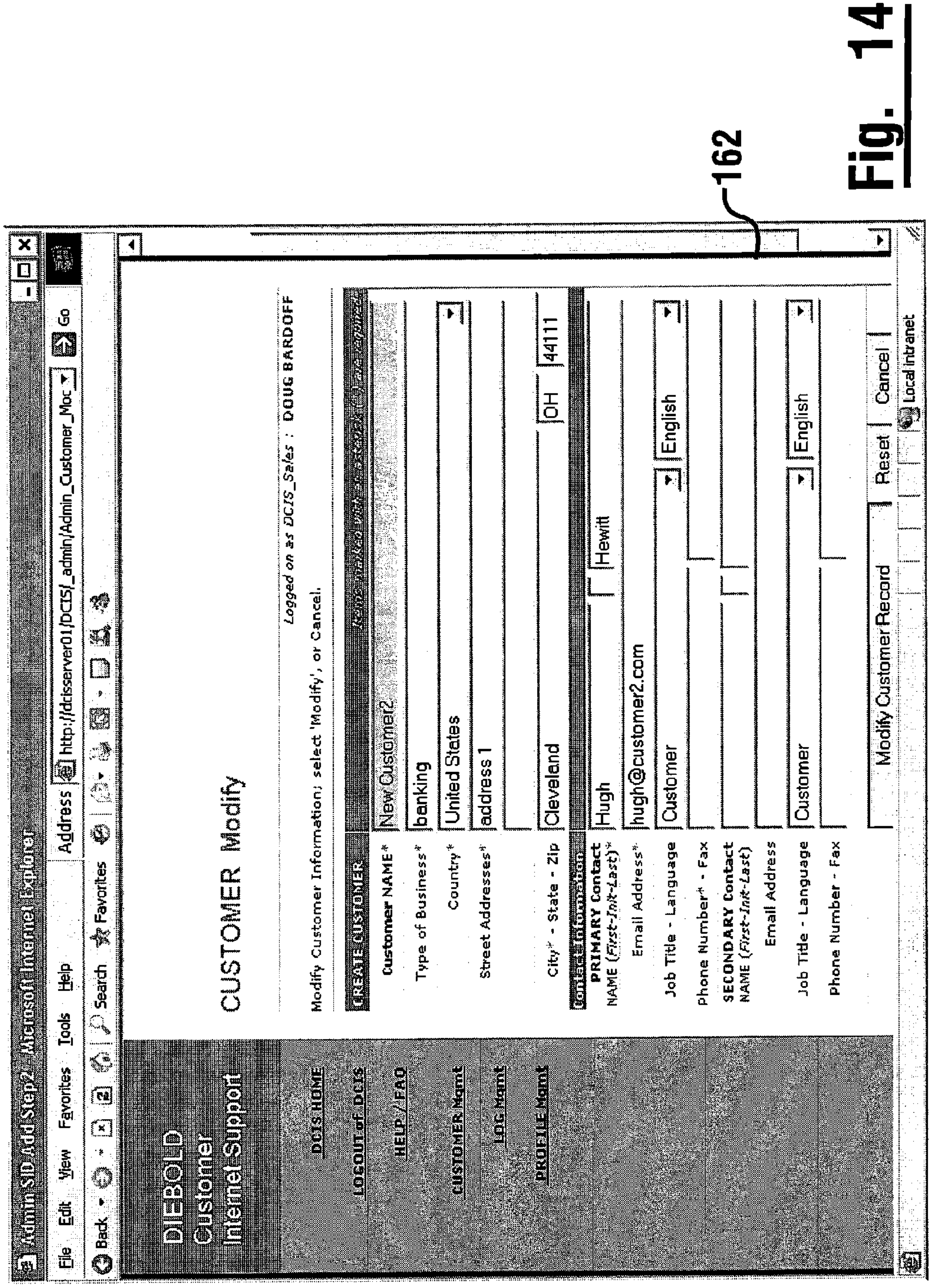
FIG. 14 is an exemplary display output created with modification of a user record.

FIG. 14 shows an exemplary screen 162 that is output from a workstation. This display is output when a sales administration person or other appropriate individual needs to modify the information included in a customer record before it is finalized and used as the basis for generating a support ID. Of course the screens described are merely exemplary of screens that may be generated through software instructions operated in workstations or servers for purposes of obtaining the input of information about entities who have operational responsibilities for machines. Such inputs may also include information on the type of software and/or ATMs operated by the particular entity or other information that is pertinent to the delivery of information or update code items to such an entity. As can be appreciated numerous approaches to the generation and input of such record data may be used. Such input data is stored in the at least one data store in operative connection with the at least one server 66.

Once data has been input concerning the customer record, the exemplary system is then operated so as to provide that particular entity with a customer support ID. The customer support ID is used for purposes of enabling authorized users associated with the entity to receive and access information and/or update code items that may be available from the one or more servers 66. The process associated with the creation of the support ID is schematically represented in FIG. 5. In the exemplary embodiment the process includes the approval and finalization of information concerning the particular entity, information about the products operated by the entity and at least one primary contact and possibly a secondary contact for the particular entity. These processes result in the creation of a unique support ID associated with that entity. Once the support ID has been created then notification is sent to the primary contacts for the entity notifying them of their authority to access and operate the system.

Figure 15:
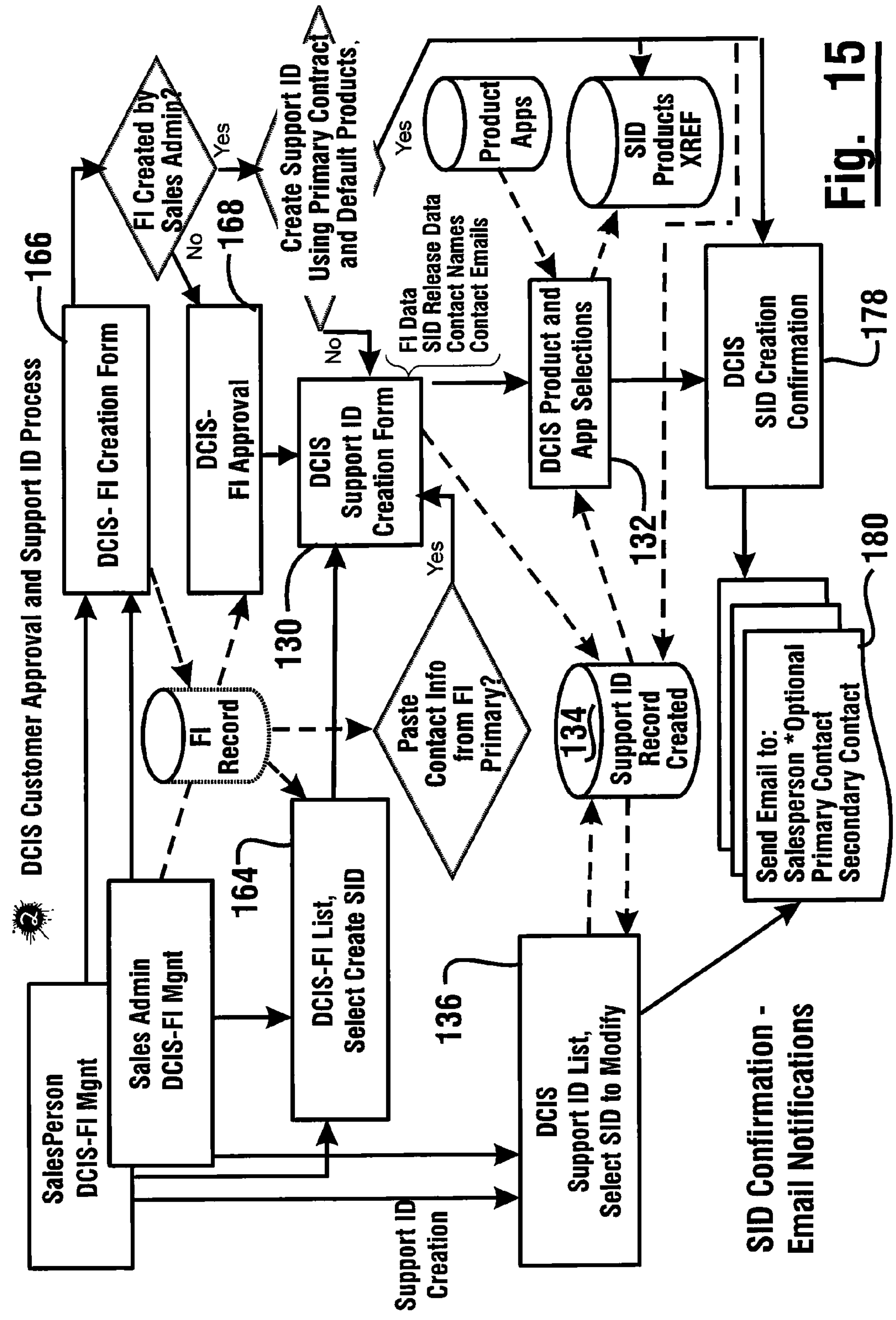
FIG. 15 is a schematic representation of processes associated with the approval and creation of an exemplary user ID.

The detailed steps associated with the approval and notification of the support ID for a particular entity are schematically represented in FIG. 15. As shown in FIG. 15 either a salesperson or sales administration function of the ATM manufacturer can request the creation of the support ID for a particular entity. This is represented by a function box 164. In order to have a support ID created, the customer record for the particular customer has to have been created and approved as previously discussed, and this is represented by function boxes 166 and 168. The creation of the support ID also requires the input of information concerning the primary contact related to the particular entity as represented by a function box 130. This data includes the input of particular contact name and e-mail address data.

In an exemplary embodiment the creation of a support ID also requires the inclusion in a database of information concerning the particular types of product items operated by the customer. This can include in the exemplary embodiment information about the types of software, ATM hardware, firmware or other items that are operated by the particular entity. This information is obtained from appropriate database, license agreements or other information and is represented by a function box 132. The information concerning the customer is then stored in the at least one database, and responsive to the programming of the server 66, a support ID record is created. This record is then stored as represented by the data store function 134. Once the support ID record has been created it is subject to being reviewed and modified by appropriate personnel as represented by the function box 136.

After the record data associated with the support ID has been created and approved, the system administrator and/or the entity responsible for the final approval process then provides instructions to the system to cause the server 66 to operate to indicate that the customer associated with the record is ready to be notified of their ability to participate in the system. This is represented by a function box 178. Thereafter the at least one server 66 operates in response to its programming to send an e-mail notification to the primary (and if so programmed, secondary) contact associated with the particular entity. This is represented by a function box 180. Further in the exemplary embodiment the e-mail notifications of the ability to participate in the system may also be sent to other personnel. This may include for example the sales people of the ATM manufacturer responsible for the particular customer, individuals responsible for supporting the customer who works for the ATM manufacturer, or other designated individuals or entities.

Figure 16:
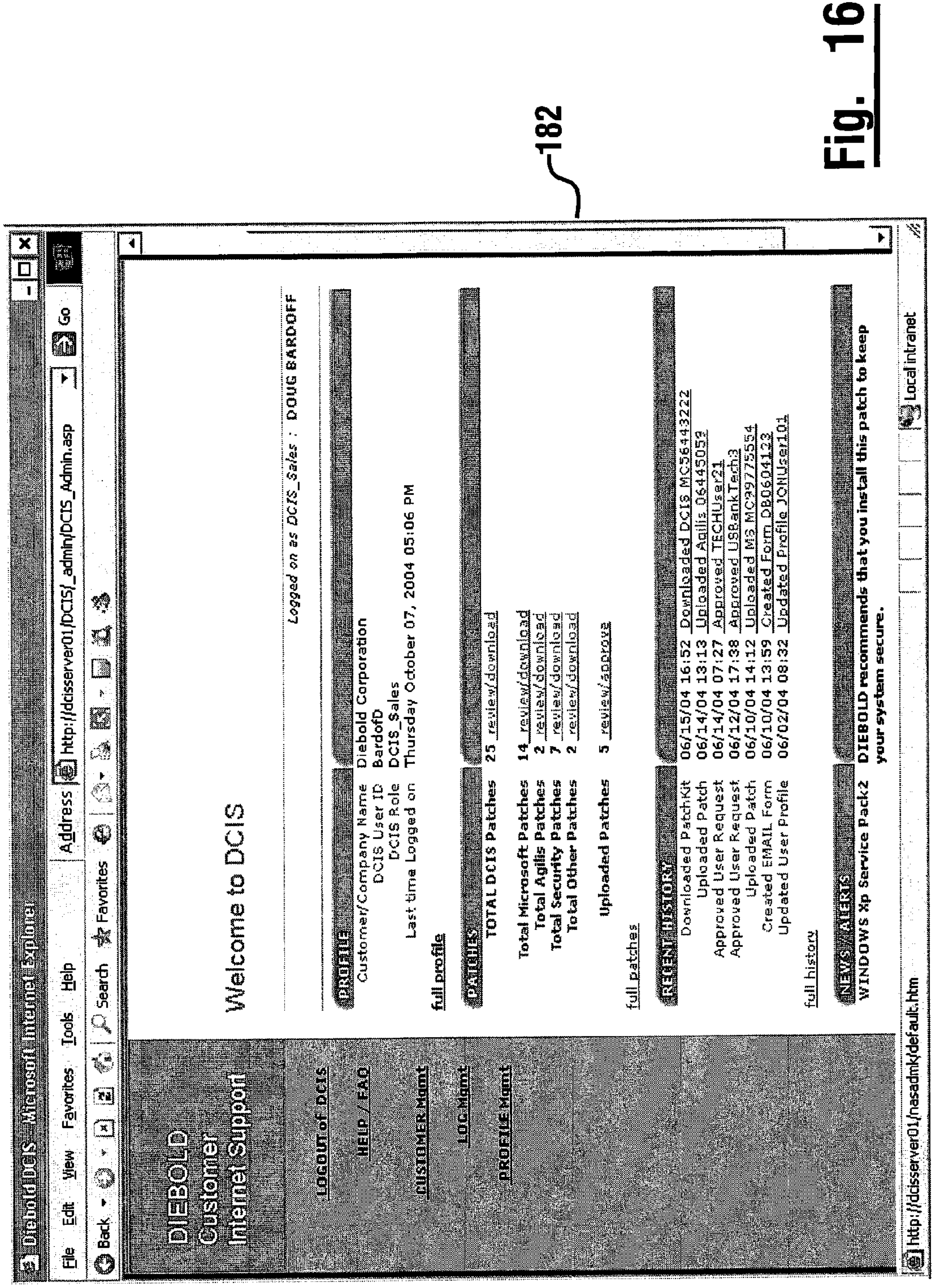
FIG. 16 is an exemplary display output associated with the creation of a user ID.
Figure 17:
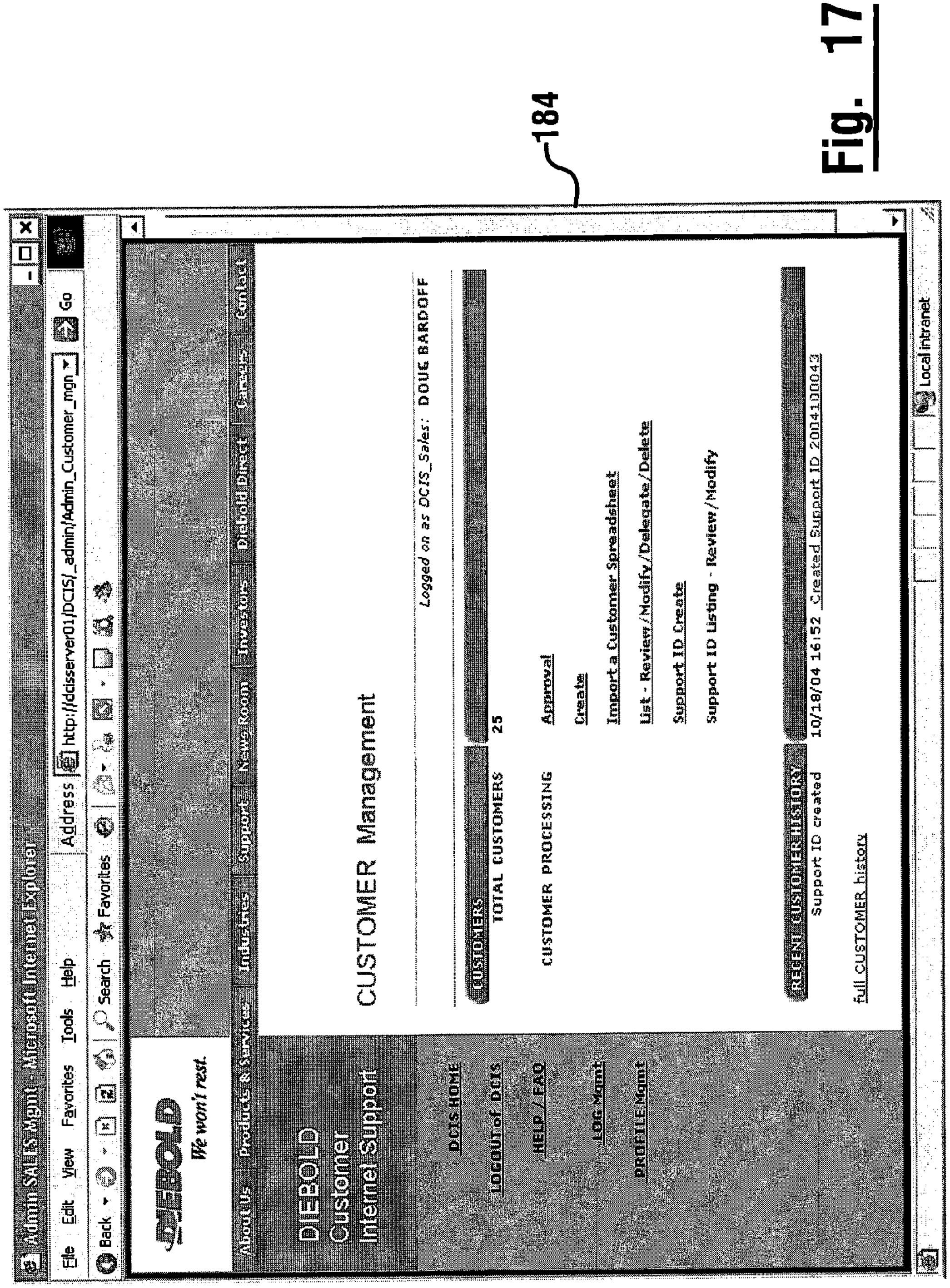
FIG. 17 is a further exemplary display output associated with the creation of a user ID.
Figure 18:
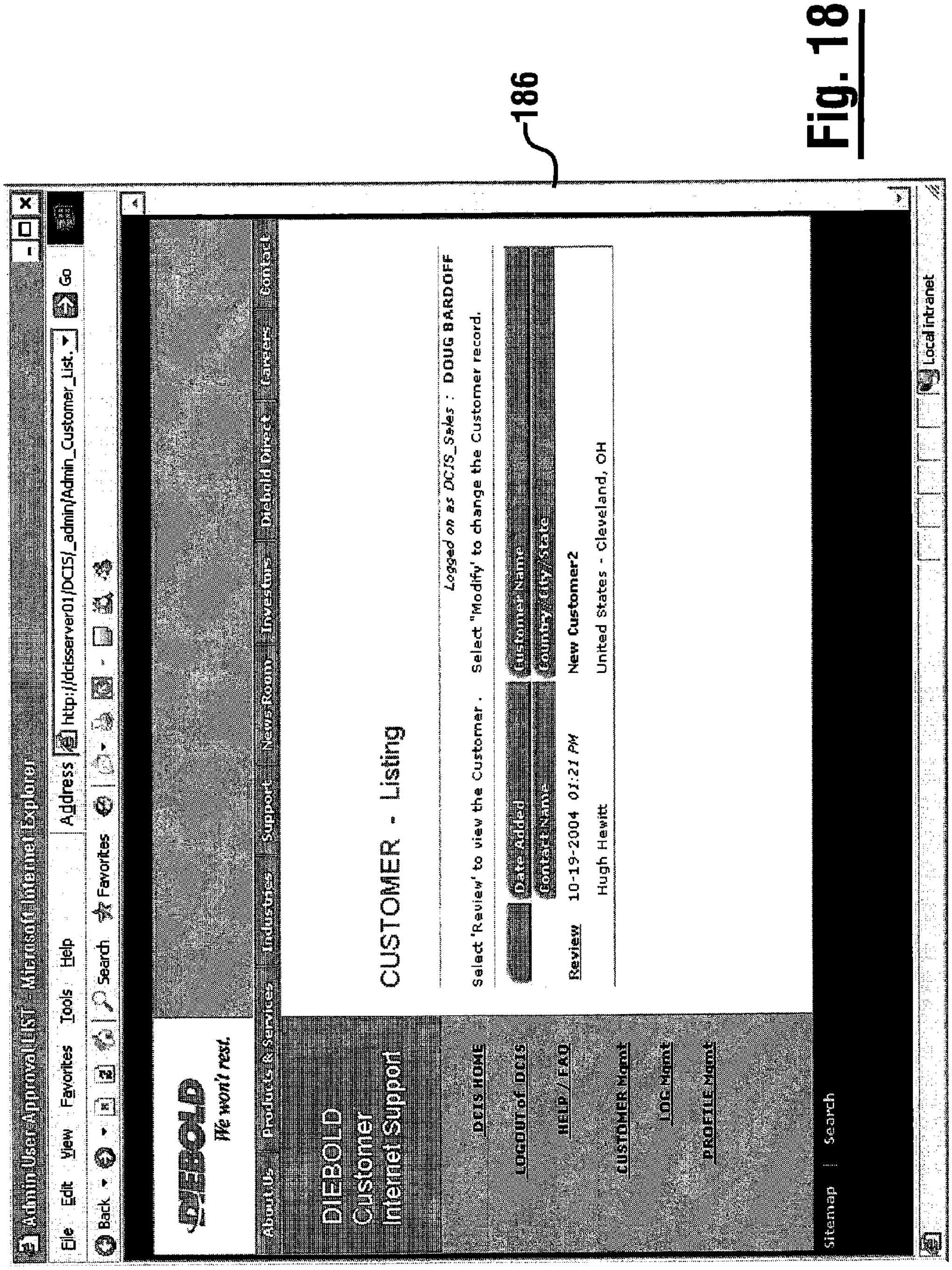
FIG. 18 is a further exemplary display output associated with the creation of a user ID.

FIGS. 16 through 21 show exemplary display outputs from workstations such as workstation 76, 78 and 80 associated with the creation of the support ID record. FIG. 16 shows a display screen 182 which is the welcome screen for accessing the system which is displayed to an authorized user. This welcome screen has the features of the welcome screen previously discussed. FIG. 17 shows a screen 184 which displays the options to an authorized user who has the authority to create, review or modify a support ID. FIG. 18 shows a screen 186 which enables an authorized user to view information that indicates that there is a customer record and enables selection of functions to review and modify the customer record information as appropriate prior to the creation of the support ID.

Figure 19:
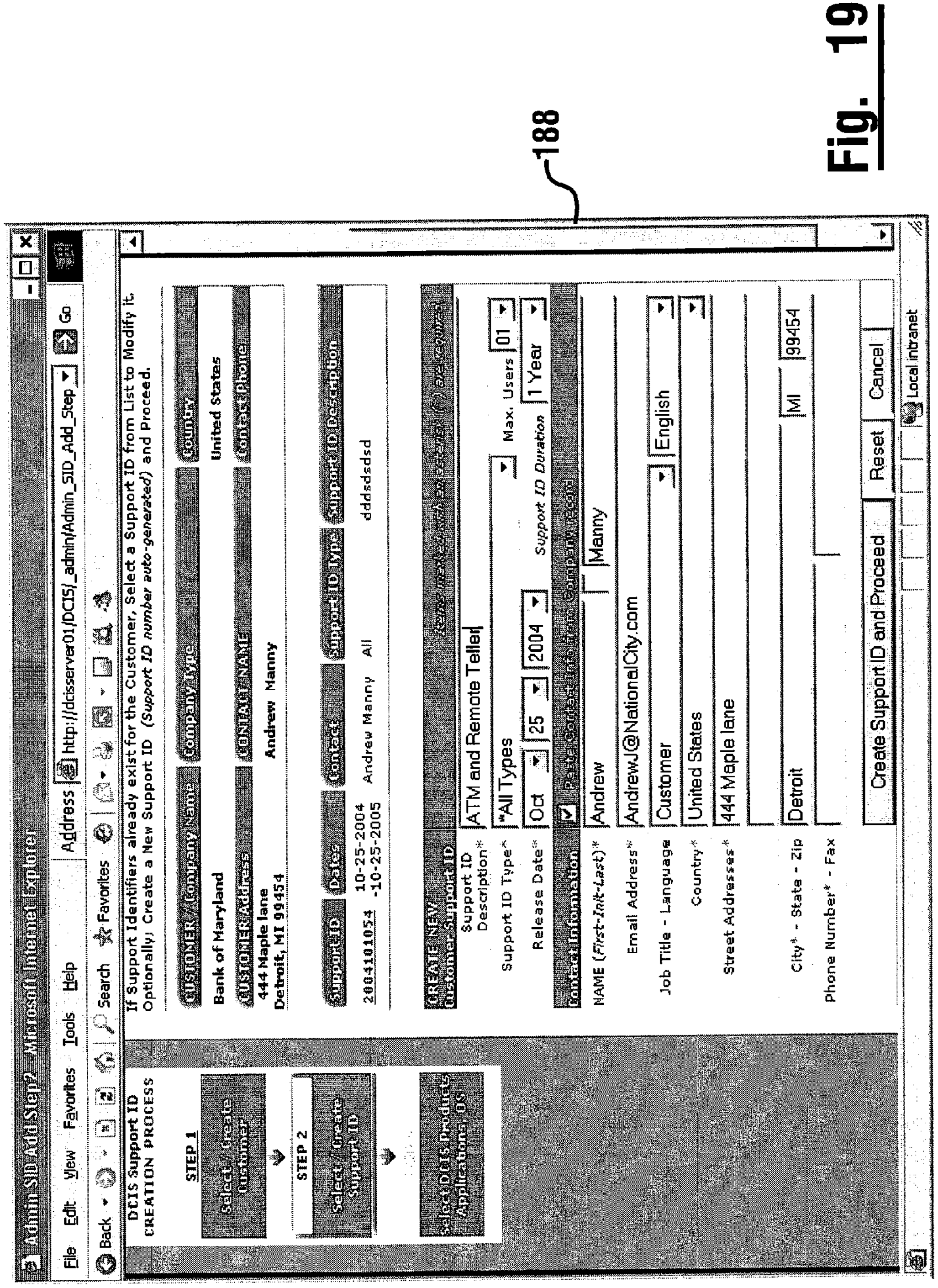
FIG. 19 is a further exemplary display output associated with the creation of a user ID.

Once a customer record has been created in the system in the manner previously discussed, an authorized user has the option of providing an input to indicate that they are now at a stage to create a support ID by selecting an icon as represented in Screen 188 in FIG. 19. Selecting the option that indicates the selection for creation of a support ID enables the authorized user to input the information concerning the one primary contact name and e-mail address for the particular entity. In the exemplary embodiment the programming of the system is operative to receive both a primary contact and a backup contact. The system is also operative responsive to the input of the data to create a support ID that is uniquely associated with the customer. As represented in screen 188 once all the data associated with the inputs has been provided by the authorized user, the user has the option to create the support ID and proceed. Alternatively a user may select icons which enable it to clear all the data or to cancel.

Figure 20:
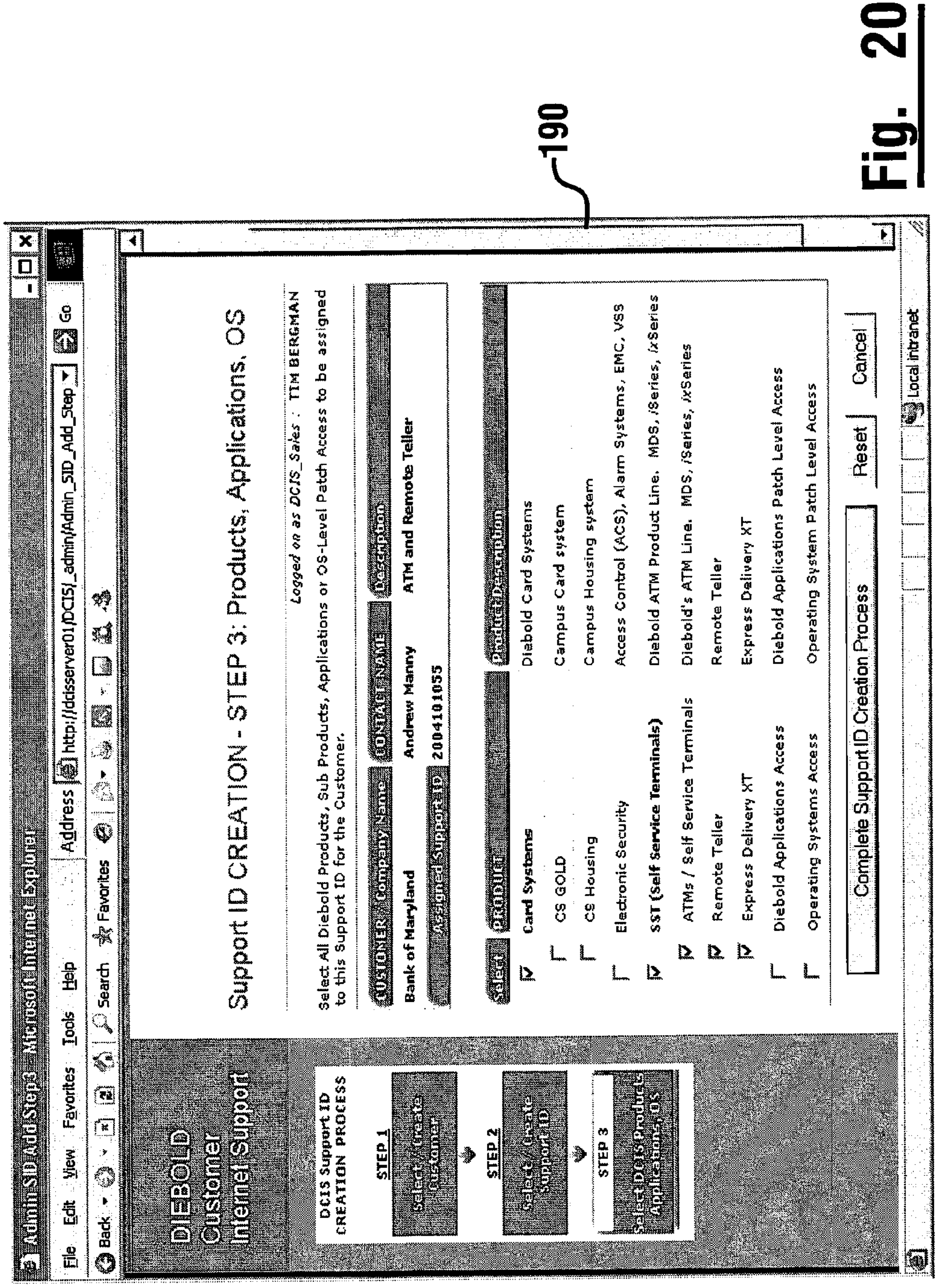
FIG. 20 is a further exemplary display output associated with the creation of a user ID.
Figure 21:
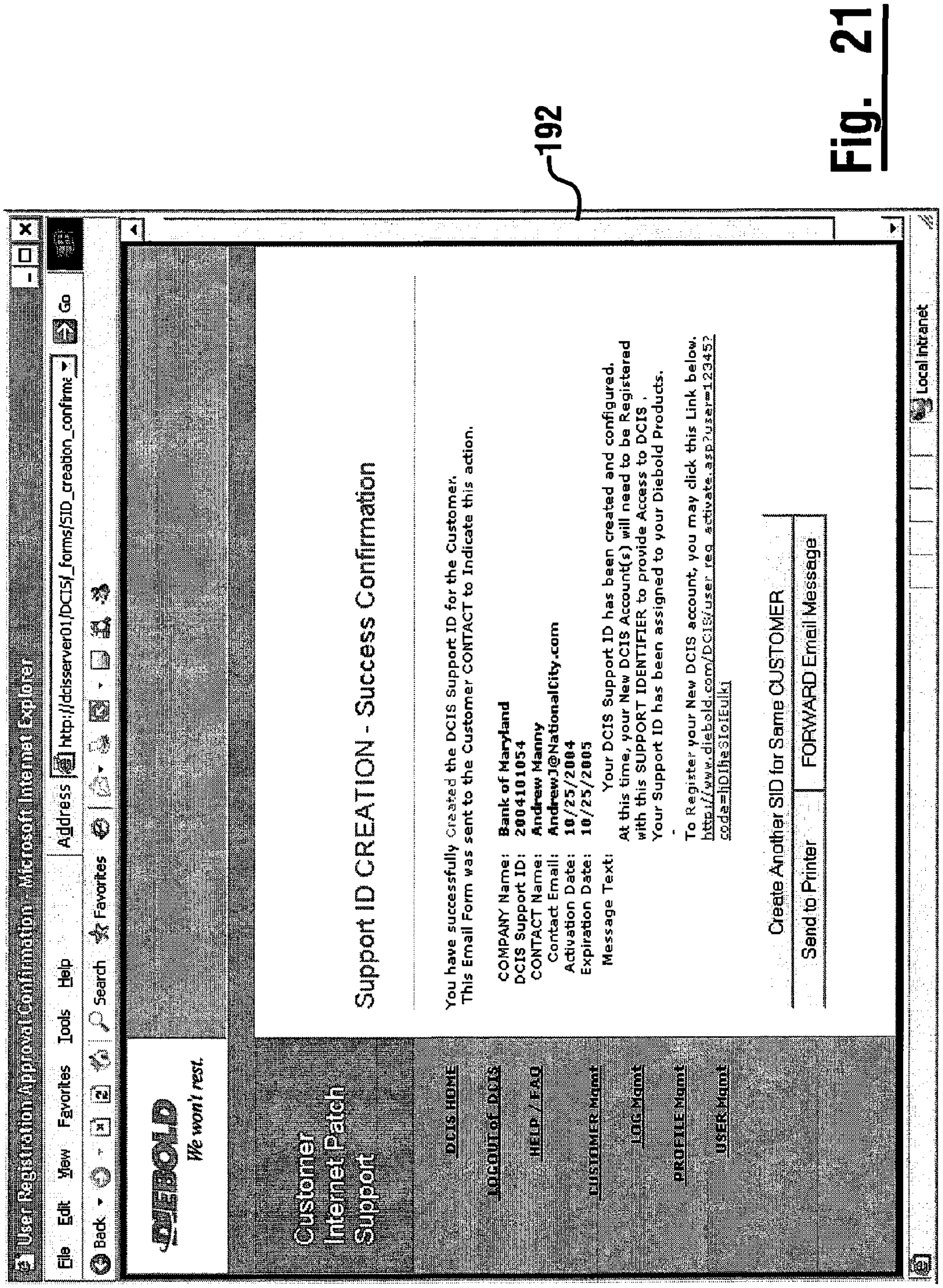
FIG. 21 is a further exemplary display output associated with the creation of a user ID.

If the authorized user has elected to proceed from screen 188, the screen 190 shown in FIG. 20 is displayed to the user in the exemplary embodiment. This screen enables the authorized user to input information concerning the particular types of products that the particular customer operates. As shown in the exemplary embodiment this may include the particular types of ATM products or other products that are operated by the particular entity. Alternatively or in addition as previously discussed, the inputs may also include the particular types of software, firmware or other information associated with the particular entity. The nature of the information input will depend on the particular capabilities of the system and its operation. As later discussed, in some embodiments the operator of the system may enable the customer users to input the information concerning the ATMs for which they have operational responsibilities.

In the exemplary embodiment once the authorized user who works for the ATM manufacturer has input the information concerning the types of products operated by the particular customer, they may then select the icon to complete the support ID creation process shown in screen 190. This then causes the workstation at which the user is inputting the information to output the exemplary screen 192 shown in FIG. 21. The output screen in the exemplary embodiment is operative to indicate that the programming of the system has created the support ID for the particular customer. The information concerning the customer, the contact information and other information is displayed to the authorized user. Of course as previously discussed in the exemplary embodiment notifications may be sent to multiple contacts and such contacts may also be displayed on the screens providing the information similar to screen 192.

If the user is satisfied with the information, they may choose to forward an e-mail message to the primary contact at the customer. If the system is programmed so that the particular user is the final approval authority for sending such message, such message will be dispatched through operation of the at least one server 66. In alternative embodiments the programming of the system may require a further review beyond the particular user. In such a case the system will be programmed not to send the message until the final approval has been indicated by the appropriate function. Once the input is provided as appropriate, e-mails are sent to the appropriate persons in the manner discussed. As also represented in screen 192, the exemplary system provides the capability to provide an input that enables the creation of multiple support IDs for a given customer. This may be appropriate for example in situations where a customer has several different operations that are run independently and/or which are not controlled by the same responsible entities. This may be for example, different regions, operational units or other operating segments of the customer entity. In addition, in some embodiments customers may receive notifications from the system for automated banking machine products and for non-automated banking machine products. Customers may choose in some cases to have such notifications go to the same persons or to different persons. In the case where notifications are to go to different persons or groups of persons, separate support IDs may be provided.

Alternatively or in addition in some embodiments user may print the support ID data to a printer. In some embodiments the support ID may be sent to a user in hard copy rather than by e-mail so as to provide additional security aspects related to the system. Of course it should be understood that these approaches are exemplary and in other embodiments other approaches may be used.

FIG. 6 schematically represents the process by which a primary or secondary customer contact who has received the support ID registers for use of the system, and may appoint additional related users who may receive notifications from the system and may access the system for reviewing information about update code items or other information. In the exemplary embodiment the primary contact inputs their support ID at their workstation and accepts a legal agreement related to use of the system. The user then selects an administrative password for future use of the system. The user is also enabled to delegate their responsibility as the primary contact and administrator for the entity to another person.

In the exemplary embodiment the primary contact is enabled to input data corresponding to a number of other users that will receive notifications and access to the system on behalf of the customer entity. If the primary responsibility as administrator for the entity is delegated and/or if additional users on behalf of the entity are selected, the server 66 operates to provide e-mail notice to those other persons. Also as represented in FIG. 6 the primary contact who serves as administrator for the customer entity is also enabled to remove other users of the system for that customer entity who have previously been designated. This may be done for example if the designated number of users on behalf of the entity has been exceeded or if one of those contact persons has left the employ of the entity. Further in the exemplary embodiment as represented in FIG. 6 if the number of designated users on behalf of the entity has exceeded the permitted number the system will operate to provide an e-mail notification to the primary contact informing them of this fact. The primary contact may then make appropriate deletions to assure that the number of persons authorized to access the system on behalf of the customer entity remains within the permitted number.

Figure 22:
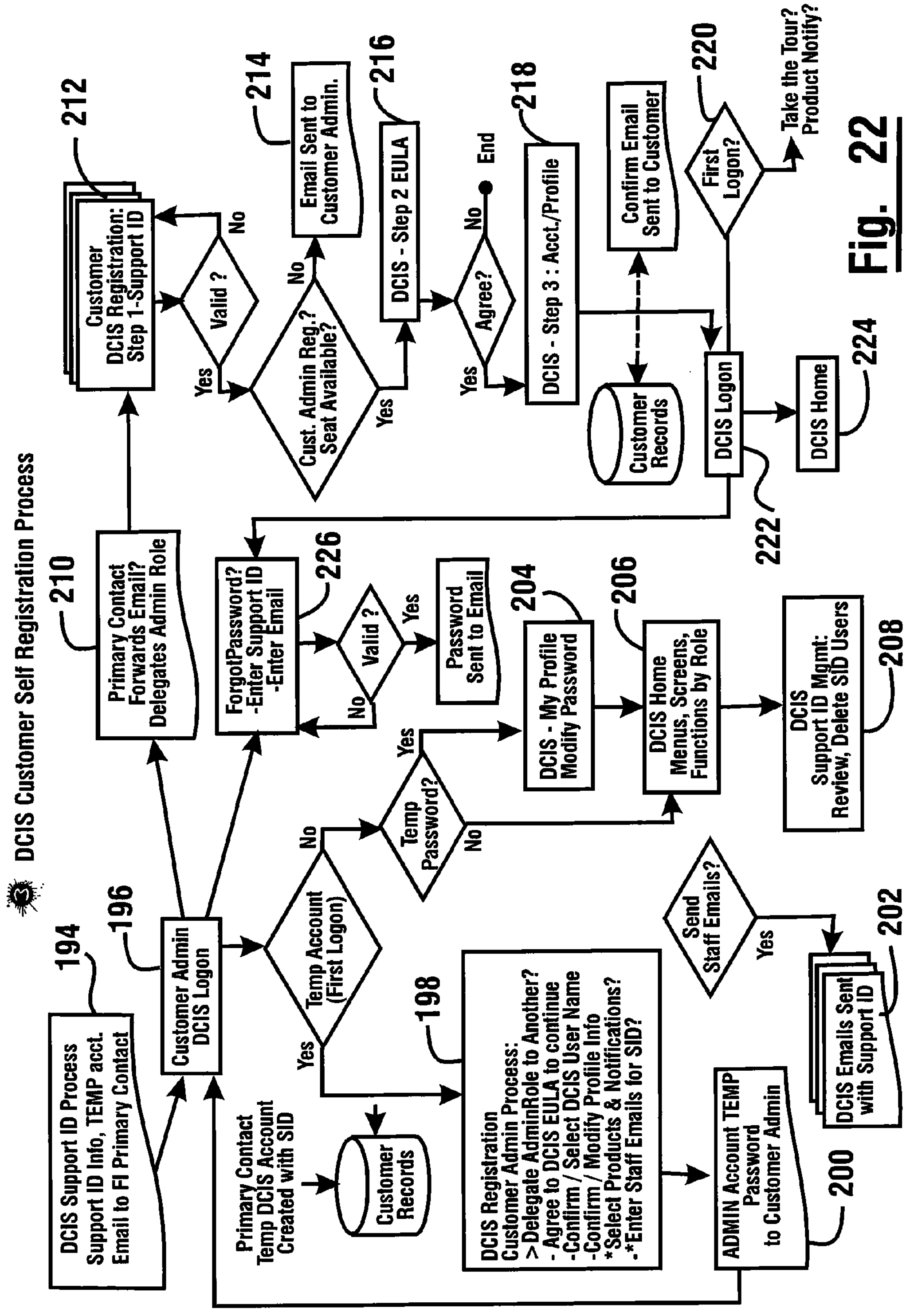
FIG. 22 is a schematic view representative of processes associated with user registration for receiving access to a system of an exemplary embodiment.

FIG. 22 shows schematically the processes executed in connection with an initial user login by the primary contact who will serve as administrator on behalf of the customer entity having operational responsibility for automated banking machines. Function box 194 represents the processes previously discussed through which a primary and/or secondary contact for the entity has received a support ID from the system. The support ID information may be sent by e-mail as previously discussed and/or may be sent in hard copy. The sending of the support ID may in some embodiments include the provision of a temporary password which the administrator/user may change.

The function box 196 represents the login of the primary administrator contact for the customer entity to the system. If the administrator indicates through an input that it is the first log on to the system, the system validates the systems ID to determine its validity. The system then operates to present to the administrative user the legal agreement associated with use of the system. The administrative user then provides appropriate inputs indicating agreement to the agreement terms and data evidencing this is stored in the at least one data store associated with the server 66 along with other information. The administrative user is also given the opportunity to delegate the administrator role on behalf of the customer entity to another person. If the administrator chooses to delegate its role to another person the information concerning to whom the administrative role is delegated, is input to the system. Alternatively if the user chooses not to delegate the administrative role, the administrative user is asked to confirm information concerning the user and on whose behalf they are operating the system.

The administrative user is also requested in an exemplary embodiment to input and/or verify the information concerning the types of products that the customer operates and concerning which they are to receive information from the system. Further the administrative user is also provided with the opportunity to designate a limited number of other persons who act on behalf of the entity and who may be allowed to access the system and/or receive notifications therefrom. This is represented in a function box 198.

In the exemplary embodiment once the administrative user has completed the information and it is stored in at least one data store through operation of the at least one processor in the at least one server 66, the at least one server operates to forward to the administrative user through the network a temporary password for accessing the system. This is represented in function box 200. Of course as previously discussed in some embodiments the administrative user may receive a temporary password at the time that they receive their support ID. In addition in some embodiments if the administrative user has indicated that other individuals are to operate the system and receive notifications therefrom on behalf of the entity, the at least one computer 66 operates to cause e-mails to be sent to those other contacts who will operate the system on behalf of the entity. This is represented in a function box 202.

In the exemplary embodiment if the administrative user for the customer has not delegated the administrative function to another person and has received a temporary password from the system by e-mail or otherwise, they may then log on the system and enter the temporary password. This is represented by a function box 196 and the decision function regarding the temporary character of the password input associated therewith. The administrative user is then presented with the appropriate screens to verify the profile information and to modify the temporary password so that it becomes a permanent password. This is represented by a function box 204. The user is then presented with additional screens that enable accessing of the functions of the system as well as the options and information that can be changed by the administrative user. This is represented in a function box 206. Of course as indicated in FIG. 22 if the administrative user logs on the system with a permanent password they are immediately directed to the functions represented by the function box 206. Also as previously discussed the administrative user has the ability to review and delete authority of other users of the system who act on behalf of the particular customer entity. This is represented by a function box 208. As can be appreciated the outputs provided to the users of the system are based on the programming associated with the at least one processor 68 in the computer 66. Inputs by users are then stored in the at least one database in at least one data store 70.

If the originally designated primary contact does not wish to serve as the customer administrator for the particular entity the at least one computer operates to send an e-mail to the address of the entity that the customer administrator has chosen to designate as the new administrator. Likewise if the administrator has indicated that others should be able to operate the system on behalf of the customer entity, the system operates to forward e-mails to those entities along with the support ID information that they are to use to log on the system. This activity is represented by the function box 210.

The entity to whom responsibility has been delegated to be the administrative user may log on to the system as represented by the function box 212. In response to this log on the at least one computer operates to determine if an administrator has already been otherwise registered for the particular customer. If for some reason an administrator has already been registered a notice will be sent to the registered administrator for the particular customer. This is represented by a function box 214. If as would normally be the case when the administrative responsibility is delegated, no administrator has been registered, the system proceeds to present the new designated administrator with the legal agreement and a user is required to accept the legal agreement to proceed with operation of the system. This is represented by a function box 216. A record of the user's acceptance of the legal agreement terms is stored in the at least one data store 70. Of course if at any time a user does not agree to the legal agreement they are returned to the initial screen and are not allowed to further operate the system.

Once the new administrative user has accepted the legal agreement they are requested to input the information previously discussed that is required of the administrative user. They may also input information concerning the products for which notifications are to be given and may also designate additional individuals to receive access to the system on behalf of the customer entity. This is represented by a function box 218. The sending of notifications to the other individuals who have been designated to access the system on behalf of the entity is represented by a function box 220.

In the exemplary embodiment the administrative user is then presented with a temporary password in the manner previously discussed, which can then be used for accessing the system as represented by a function box 222. The user can then change the password, change information and can execute the authorized administrative functions as represented by a function box 224. Of course information input by the user is stored in the at least one data store in operative connection with server 66 and used as the basis for operation of the system as later described.

In exemplary embodiments provisions are made for a situation where the administrator has forgotten their password. In such circumstances the user can enter the correct support ID and receive a temporary password via e-mail or other delivery method. This is represented by a function box 226. Of course these approaches are exemplary and in other embodiments other approaches may be used.

For additional users that are designated by the administrator to receive notifications and to operate the system on behalf of the customer entity, the process for registration is generally similar to that described for an administrator except that the other users do not have access to all of the functions that are accessible to an administrator. Specifically such regular users enter a support ID and in some embodiments a temporary password. Such users are required to accept the legal agreement. Such users are also enabled to establish their own permanent password and to update their contact information. Alternatively or in addition in some embodiments users may be enabled to change the information concerning which products they are responsible for and will receive notifications from the system. This may enable a particular user in some embodiments to assume responsibility for some but not all products operated by the particular entity. It may also enable a more technically sophisticated user to provide inputs as to particular products for which they have operational responsibility and for which information can be received in the system. Of course the information input by a user is stored through operation of the at least one server computer 66 in the at least one data store 70. It should also be understood that these approaches are exemplary of various approaches that may be used.

FIGS. 23 through 30 show exemplary screen outputs provided on a customer administrator's workstation in connection with performing the functions previously described. These screen outputs are generated through operation of the at least one computer 66 and communicated to the user's workstation through the at least one network 84.

Figure 23:
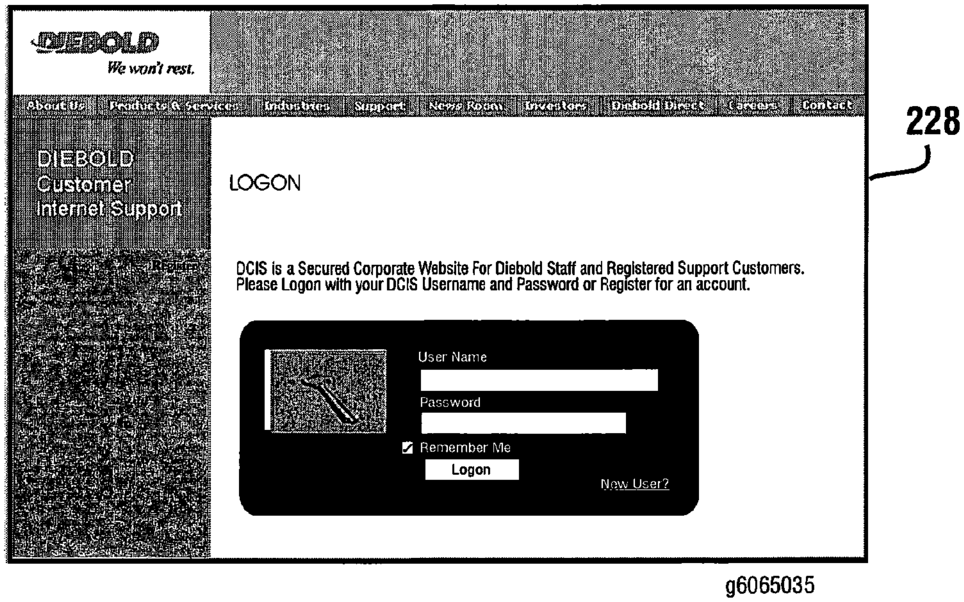
FIG. 23 is a further exemplary display output provided to a user registering to use the system.

FIG. 23 shows an exemplary display screen 228. Screen 228 is a user log on screen that is presented to users of the system. If a user has a designated user name and password already established in the system, the data is entered in response to presentation of this screen. If however the user is a new user they can click on the appropriate text and register for the system.

Figure 24:
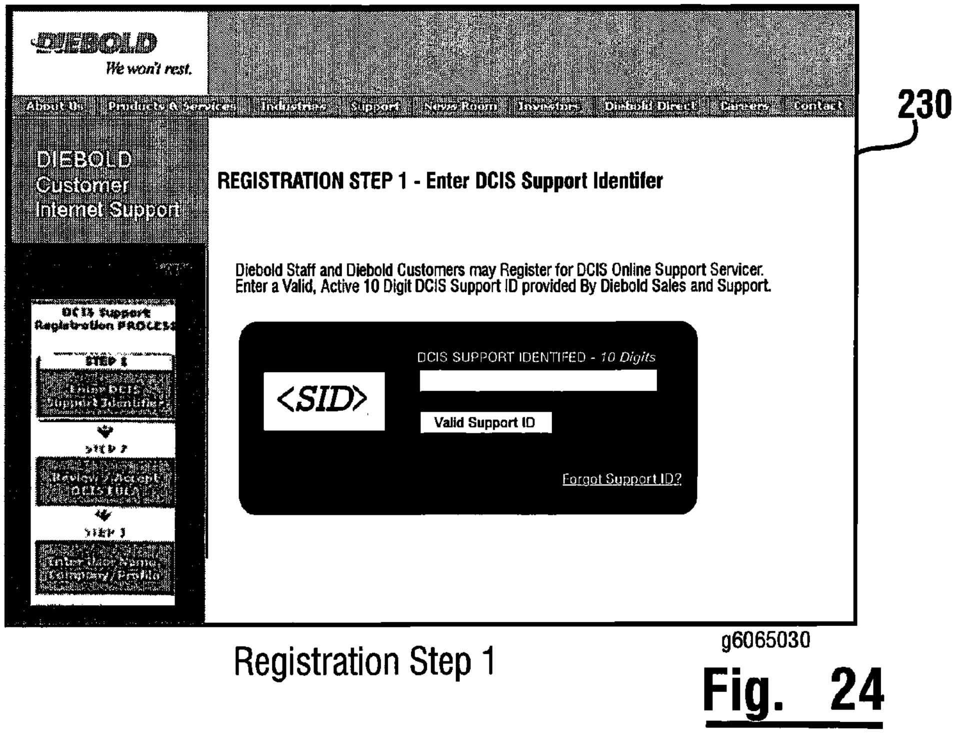
FIG. 24 is a further exemplary display output provided to a user registering to use the system.
Figure 25:
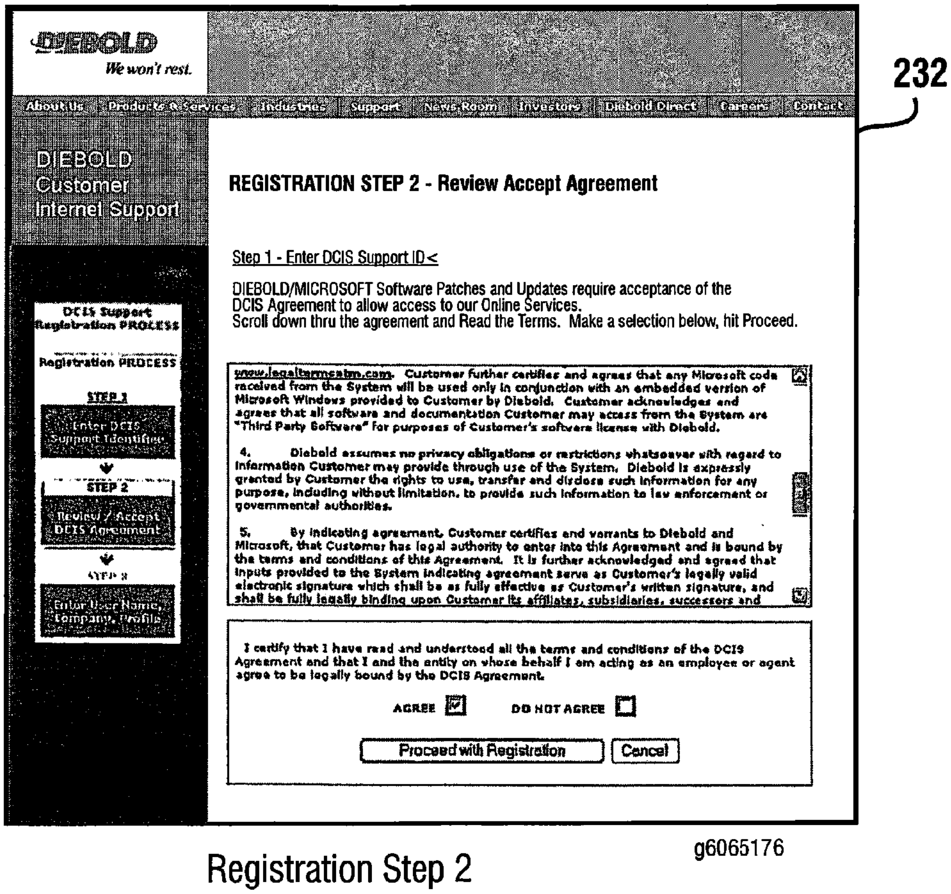
FIG. 25 is a further exemplary display output provided to a user registering to use the system.
Figure 26:
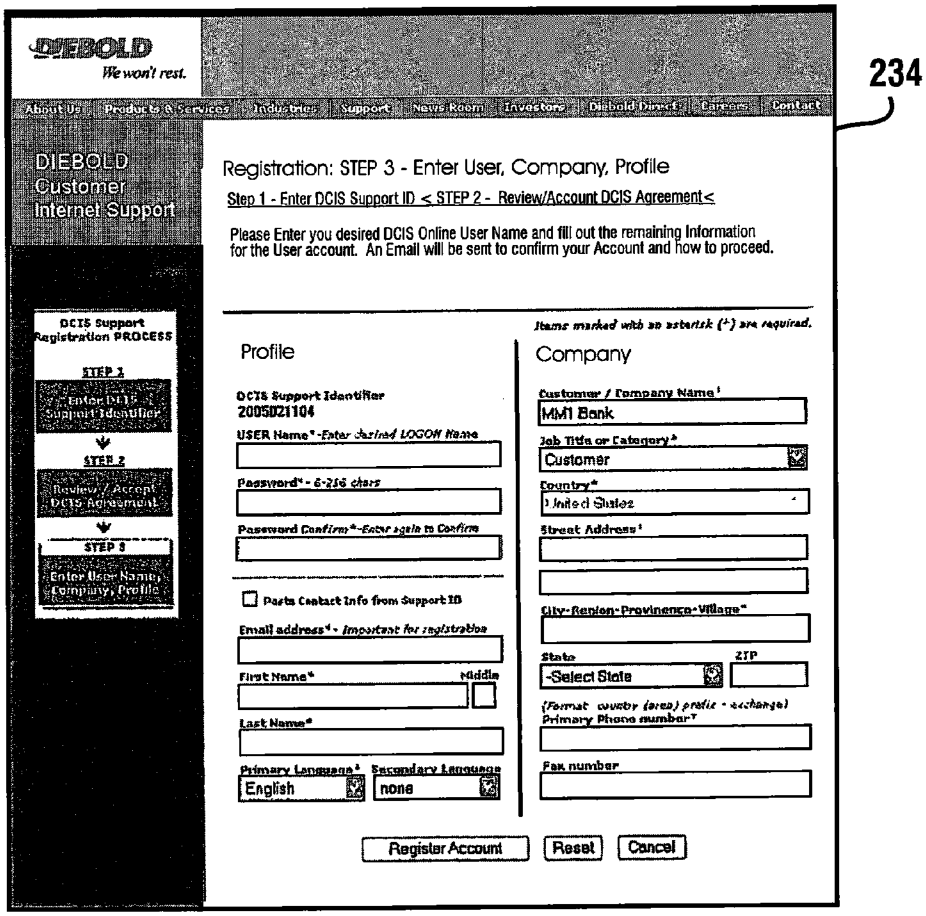
FIG. 26 is a further exemplary display output provided to a user registering to use the system.
Figure 27:
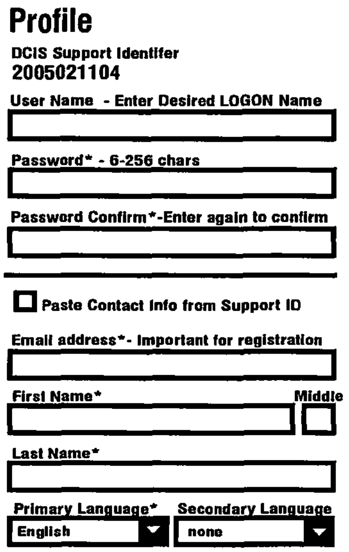
FIG. 27 is a further exemplary display output provided to a user registering to use the system.

Indicating that they are a new user causes screen 230 in FIG. 24 to be presented. Screen 230 requests that the user input a support ID that they have received from the system. Once the user inputs the support identifier and requests that it be validated, the system operates responsive to computer 66 and at least one processor 68 to validate the support ID based on information stored in the at least one data store.

If the support ID is valid, the user is next presented with a legal agreement which outlines the terms governing their use of the system. This is represented by a screen 232 shown in FIG. 25. The user reviews the legal agreement and indicates that they agree. If the user does not indicate agreement they are prevented from operating the system and are returned to the initial system entry screen.

Figure 28:
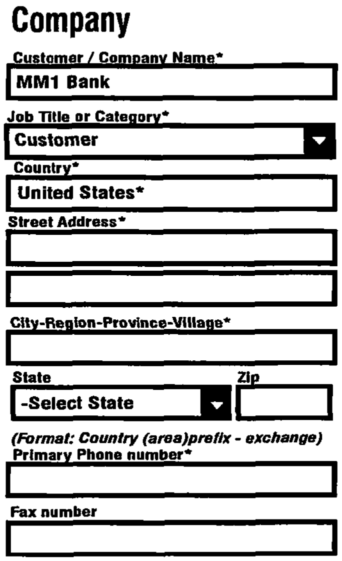
FIG. 28 is a further exemplary display output provided to a user registering to use the system.
Figure 29:
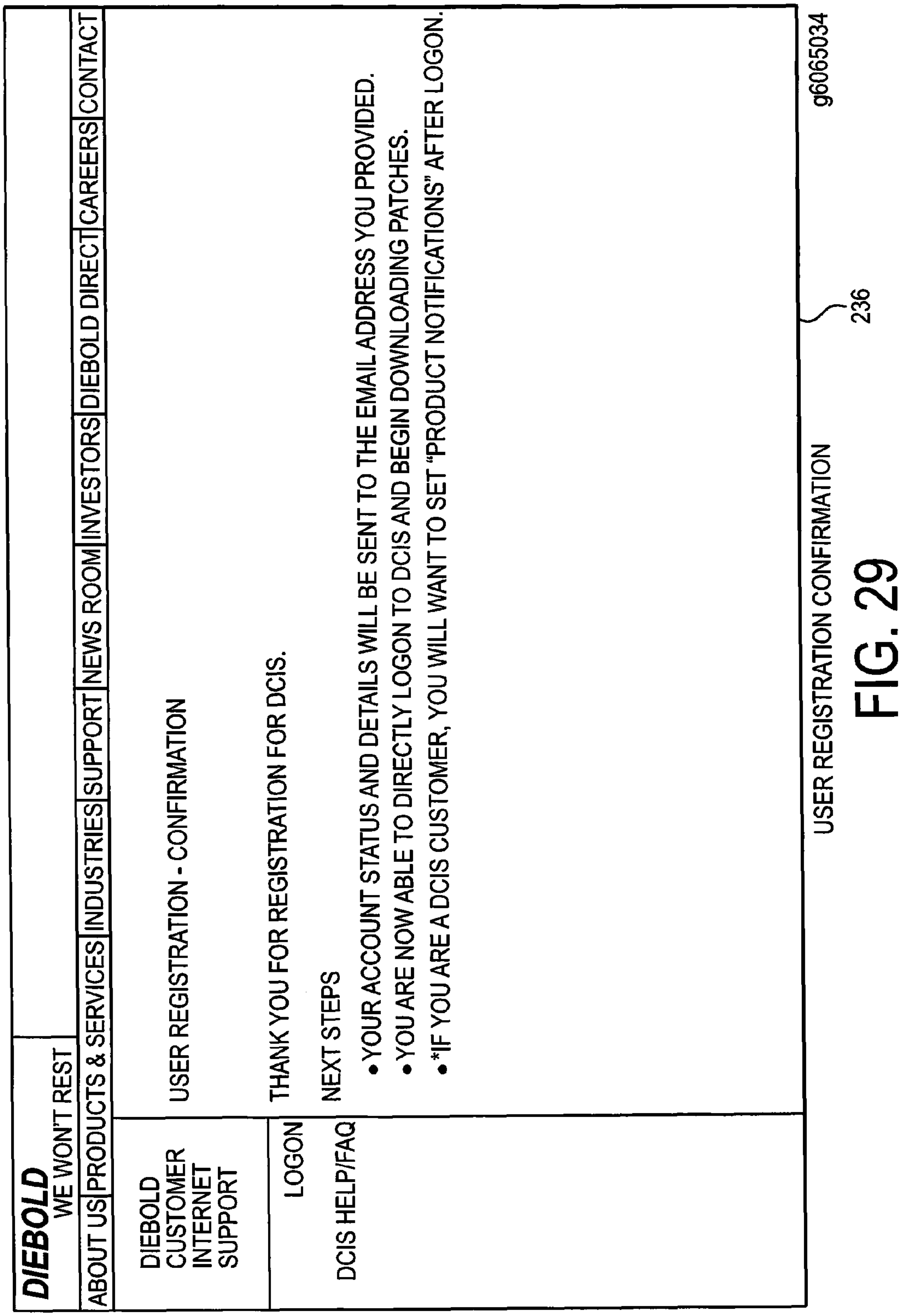
FIG. 29 is a further exemplary display output provided to a user registering to use the system.
Figure 30:
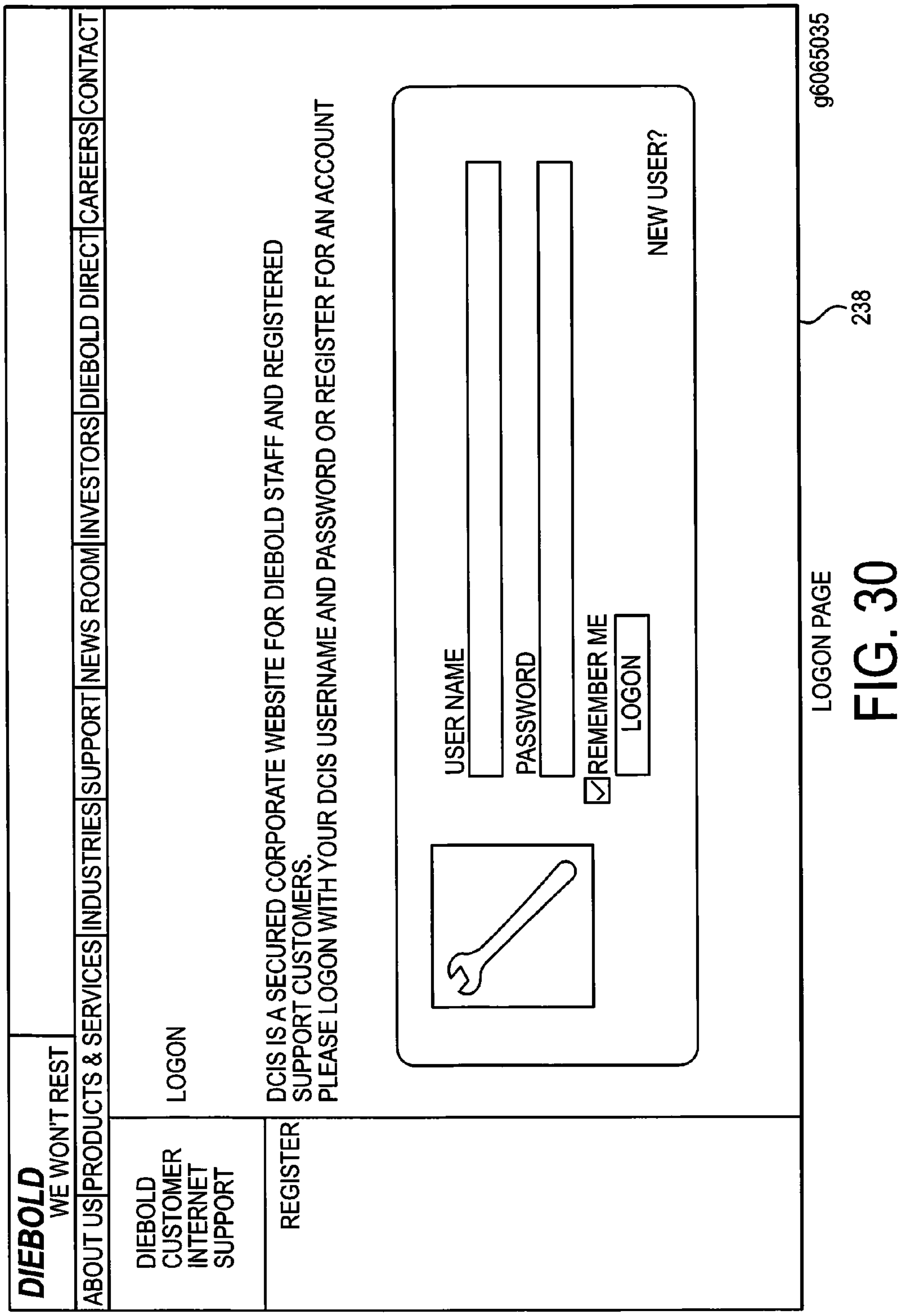
FIG. 30 is an exemplary display output provided to a user after they have registered to use the system and who wish to log in to the system.

If the administrative user has accepted the legal agreement they are then presented with a screen through which they enter profile information as well as information about the entity on whose behalf they are accessing the system. This information is represented by screen 234 in FIG. 26. As can be appreciated in the exemplary embodiment information concerning the particular entity may already be completed through the process in which the record for the customer was created by the ATM manufacturer and which resulted in the issuance of the support ID. However, in the exemplary embodiment the administrative user is authorized to modify this information and to provide additional information to the system. This portion of screen 234 is shown in FIG. 28. Of course as can be appreciated information that is input by the administrative user is stored in the at least one data store in connection with computer 66.

The administrative user is also required to input information that will enable them to access the system. This includes a designated user name and password. The user is enabled to use their own name or a fictitious name as their system name. The user can also select their own password. In the exemplary embodiment the user is asked to input the password twice so as to verify its accuracy.

Further in the exemplary embodiment the administrative user is required to input their e-mail address as well as their actual name. The user is also given the opportunity to elect to access the system using other languages or in multiple languages. In the exemplary embodiment the user is enabled to select the language in which to access the system as well as a secondary language in which outputs from the system may be received. Of course as can be appreciated all of the data input is stored in the at least one data store associated with at least one computer 66.

In exemplary embodiments users who operate the system on behalf of a customer entity but who is not the administrator for that entity, may have the ability to enter some of the information which may be input through screen 234 but not other information. For example in some exemplary embodiments each user may enter the information shown in the output in FIG. 27 but may not be able to change any of the information shown in the output in FIG. 28. Of course this approach is exemplary and in other embodiments other approaches may be used.

As previously discussed once the user has entered the appropriate information, in an exemplary embodiment the user may receive a temporary password via e-mail. The user is notified of this in the exemplary embodiment through a screen 236 shown in FIG. 29. Thereafter the user may log off the system or may use the temporary password immediately to log on the system as represented in screen 238. Of course it should be understood that these approaches are exemplary.

FIG. 7 shows schematically the processes that an authorized customer user may use in conjunction with an exemplary system. A user who logs on the system is first checked for having a valid user ID and password that corresponds to data stored in the at least one data store 70. The user indicates agreement to the legal terms associated with use of the system and a record of such agreement is stored in at least one data store. An authorized user is also enabled to input or modify information concerning the types of computer programs or products concerning which they wish to receive notifications from the system. An authorized user then can also review any new information that may be available from the system concerning the particular products or items for which they have elected to receive notifications.

Further in the exemplary embodiment the user is enabled to review historical information concerning use of the system. This may include any prior notifications or downloads of information they may have conducted from the system or other information that is pertinent to helping them track their activity and store it in connection with the system. Further in the exemplary embodiment users may be enabled to download update code items through the system so as to provide update changes to computer programs that are operated on their automated banking machines.

Figure 31:
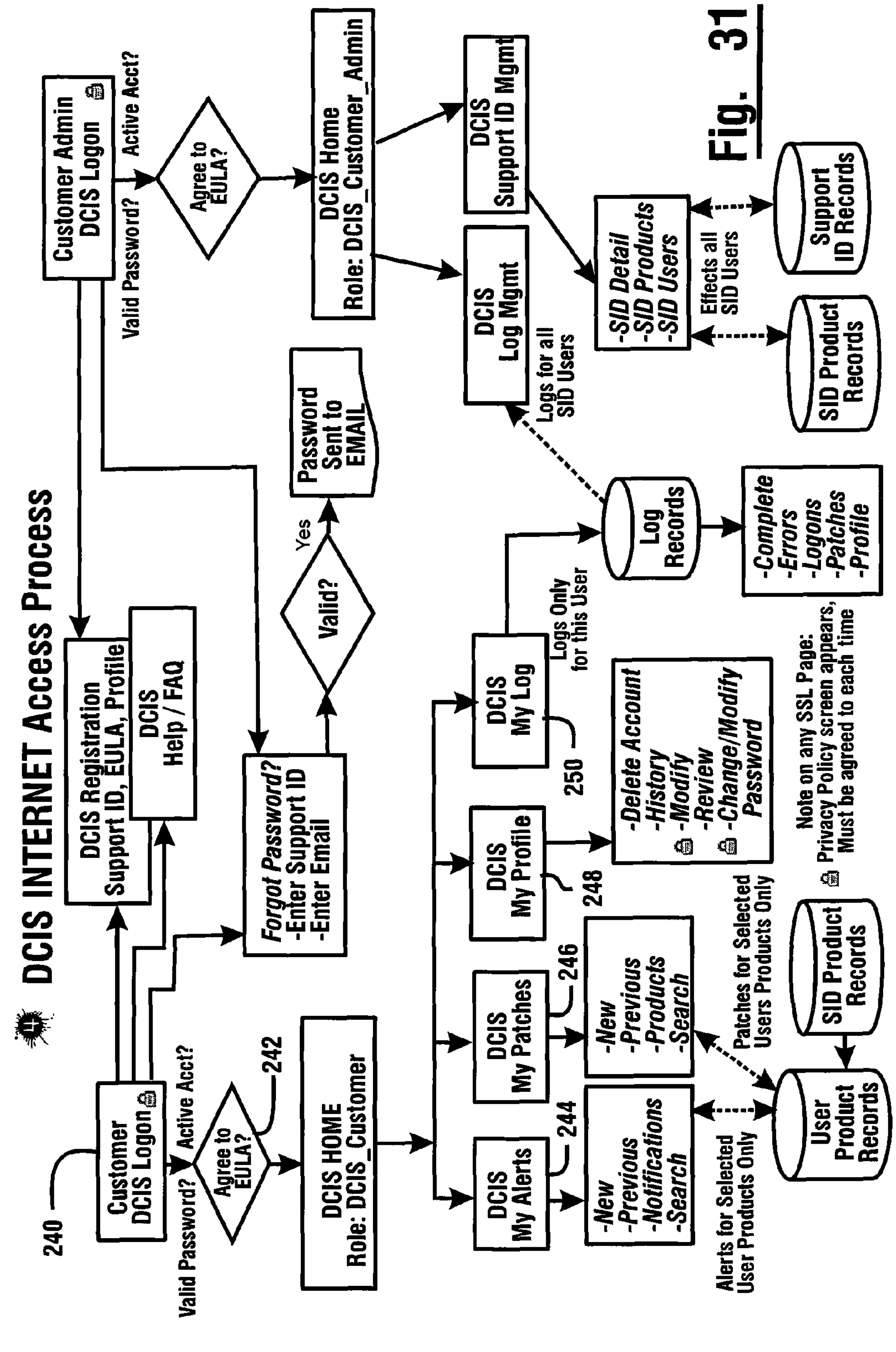
FIG. 31 is a schematic view of the processes associated with a registered user accessing the system and receiving information therefrom.
Figure 32:
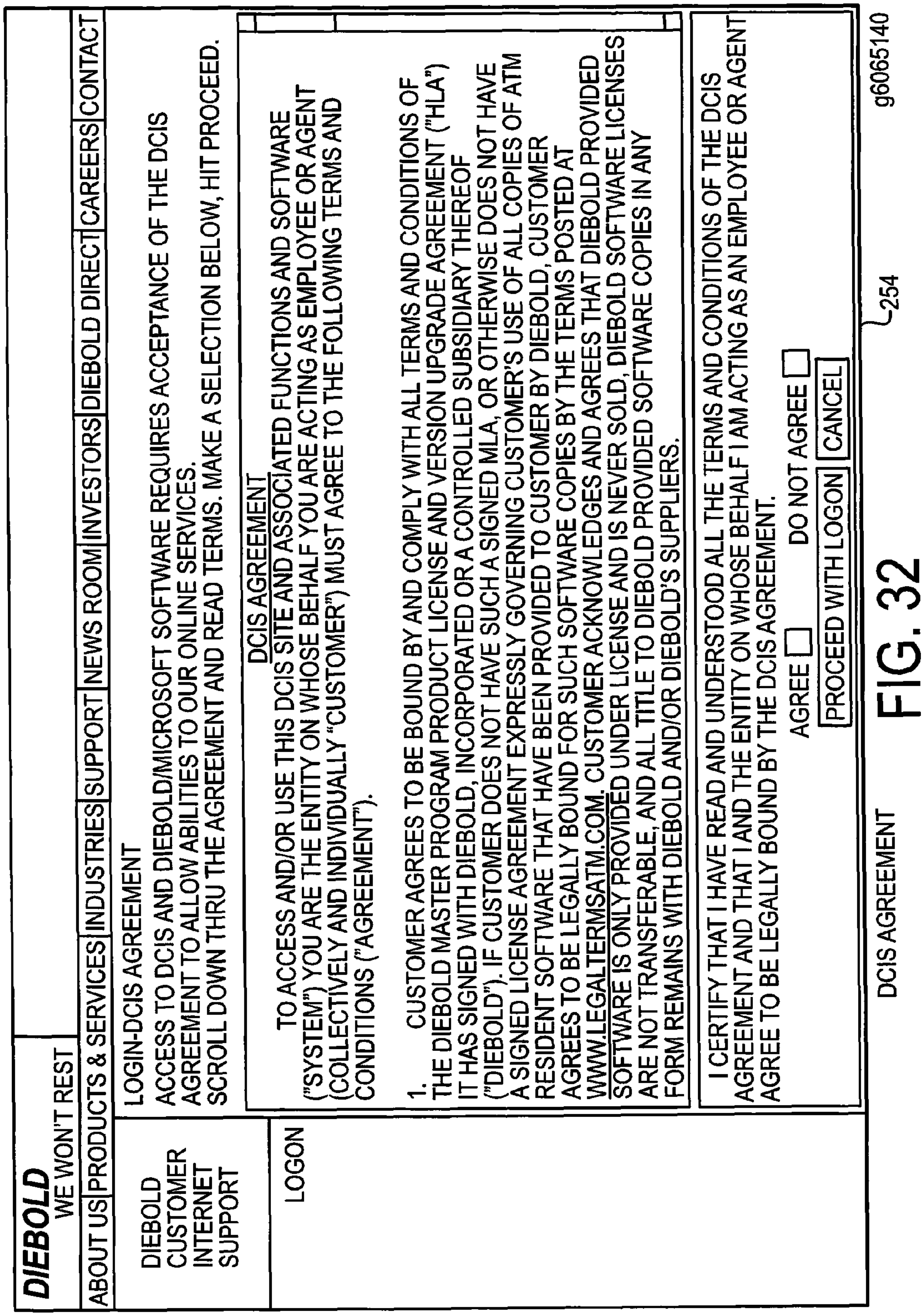
FIG. 32 is an exemplary display output provided to a registered user of the system.

FIG. 31 shows schematically exemplary processes associated with user operation of the system. As indicated by a function box 240 when a user logs on the system they are required to input their user name and password. The input data is then checked for validity against information stored in the at least one data store. If the information is correct the user is then presented with the legal terms associated with use of the system and an indication of agreement is required to further operate the system. A record of the user login and agreement to the legal terms is stored in the at least one data store.

A user who is properly logged on to the system is then presented with a particular interface which is the home screen for navigating to particular information that the user may wish to receive. This is represented by a function box 242. From this home screen the user is enabled to selectively navigate to other functions provided by the system. These functions include the ability to review any alerts or other information that is specific to the products with which the user is associated. This is represented by a function box 244. The exemplary functions provided through the system associated with this capability include the ability to review new information that has been made available by the system since the previous log on by the user. The user can also review previous information or notifications that have been given. In addition this function enables the user to search for information related to particular products. As schematically indicated, the at least one processor 68 in the at least one server computer 66 operates to provide a user in the exemplary embodiment only that information that is associated with the products indicated in their particular profile.

In the exemplary embodiment a user is enabled to review information concerning update code items or other information available for download from the system related to the particular products for which they have operational responsibility. This is represented by a function box 246. In the exemplary embodiment the system enables the download of update code items that provide update changes to computer programs operated on automated banking machines for which the entity with which the user is associated has operational responsibility. As indicated in FIG. 31 this functionality enables the user to review information concerning new update code items which have been made available since the last log on. It also enables the user to review update code items previously available as well as to review products with which update code items and information are associated. The user can also search for information concerning particular items.

Also in the exemplary embodiment a user is enabled to download update code items such as patches from the system. It should be understood that in the exemplary embodiment a user is presented with information concerning update code items only for those particular products with which the user is associated through their profile. In addition in the exemplary embodiment certain update code items are not available to be downloaded from the at least one computer 66. However alternatively and/or in addition, certain update code items may be downloaded from other computers such as computers associated with the owner of the particular software code. This may be done in some embodiments by linking through one or more networks to other computers such as servers 86 and 88. Provision may be made for providing a link to the particular system address from which desired update code items can be obtained. Of course this approach is exemplary and in other embodiments other approaches may be used.

In the exemplary embodiment an authorized user is enabled to access profile information. This includes information concerning their account, the products with which they are associated and other information. This is represented by a function box 248. In addition an authorized user is enabled to change certain of this information depending on the privileges that they have been granted by the administrator for the particular entity on whose behalf they are acting.

In the exemplary embodiment the system maintains a log in the data store which corresponds to the activities of the particular user. This is represented by a function box 250. This functionality provides a user with a record of their activity on the system. Such activity on the system may include records of the user's log ons to the system, the information that they have reviewed, information concerning their profile, changes to their profile, patches such as update code items or other information that they have accessed from the system, any errors that the system has encountered with regard to attempting to download update code items, or other information for the particular user or other items of information that are retained through operation of the at least one server computer 66 and the at least one database 70. Of course it should be understood that these functions are exemplary and in other embodiments other approaches may be used.

As represented in FIG. 31 the exemplary system also provides for dealing with situations where a user has forgotten their password. The exemplary system also provides the capability for administrative users to perform additional functions in addition to those of regular users as generally previously discussed. Of course it should be understood that these particular functions are exemplary of those that may be provided by such a system. It should further be understood that although the exemplary embodiment is discussed particularly in connection with update code items which are applicable to software programs operated in automated banking machines, the principles described are also applicable to similar information and corrective code or instructions which may be applicable to firmware or hardware devices used in ATMs as well as other types of devices or systems.

FIGS. 32 through 39 show exemplary screen outputs provided on a customer workstation associated with the functions that a user is authorized to perform. Screen 254 shown in FIG. 32 indicates the legal terms associated with the user's operation of the system. In the exemplary embodiment a user is required to agree to the legal terms each time that they access the system. A record of the user's agreement is stored in the at least one data store 70 through operation of the at least one processor in computer 66.

Figure 33:
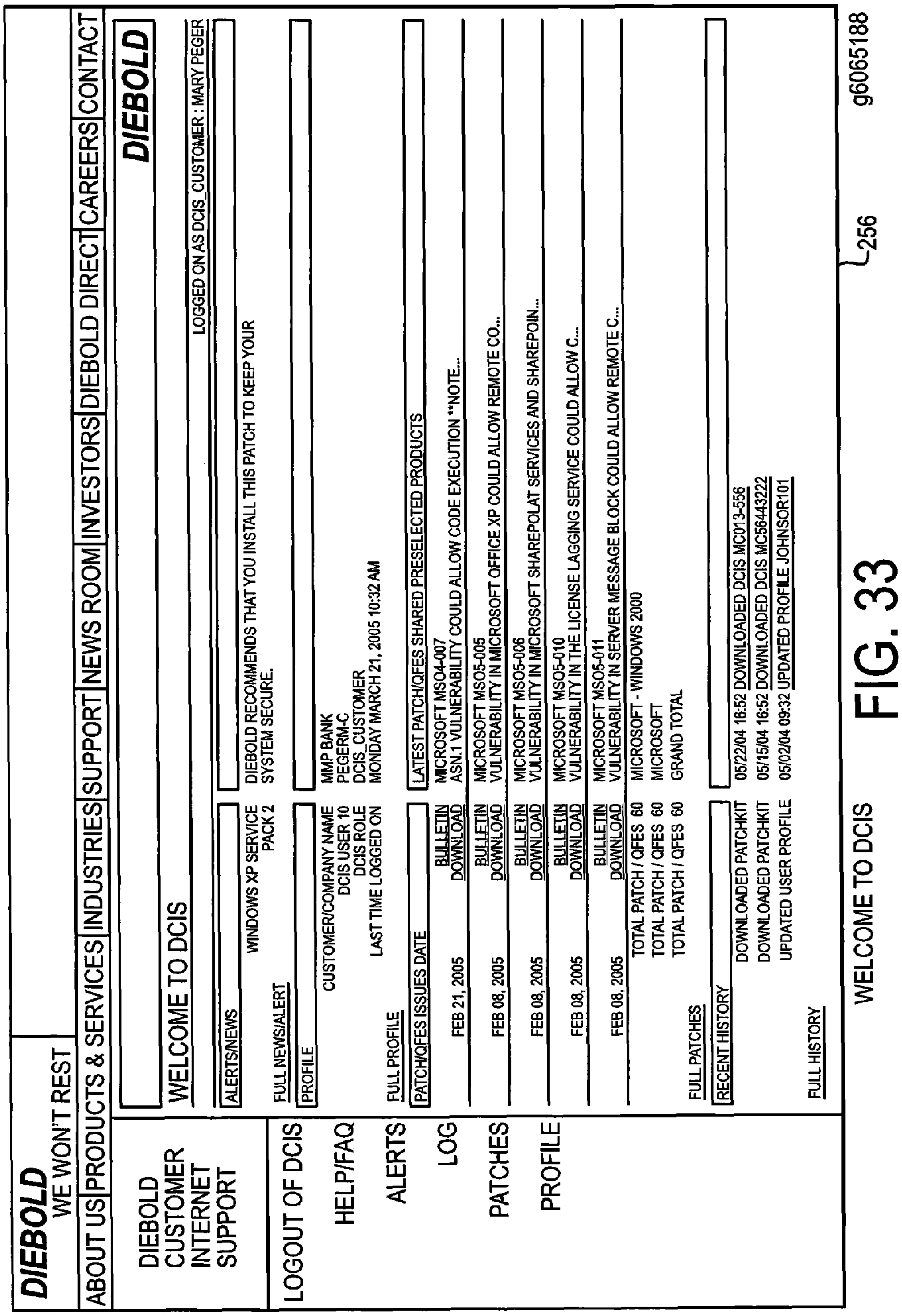
FIG. 33 is a further exemplary display output provided to a registered user of the system.

Screen 256 shown in FIG. 33 represents an exemplary home screen that is accessed by an authorized user after they have successfully logged on the system and accepted the legal terms. In the exemplary embodiment the home screen includes alerts or news related to update code items or other information that computer 66 has determined the particular user should receive based on the particular computer programs or other items for which the user has been indicated to be responsible. This determination is accomplished by the computer based on the user profile data stored in the at least one data store. The exemplary screen 256 further includes information concerning the user profile data including information such as the entity with which the user is associated, their user ID, the functions they have previously performed and the last user log on.

The exemplary home screen also provides a user with information concerning update code items that are available related to the particular computer programs or other devices for which the user is responsible. As can be appreciated the home screen may only show the most recent items added to this category. In addition the exemplary home screen also shows historical information including recent update code items that the user has downloaded. Again in the exemplary home screen only recent items are listed. In the exemplary embodiment the user is enabled to select the full listing of items under the various categories by selecting an icon which provides the full information.

Figure 34:
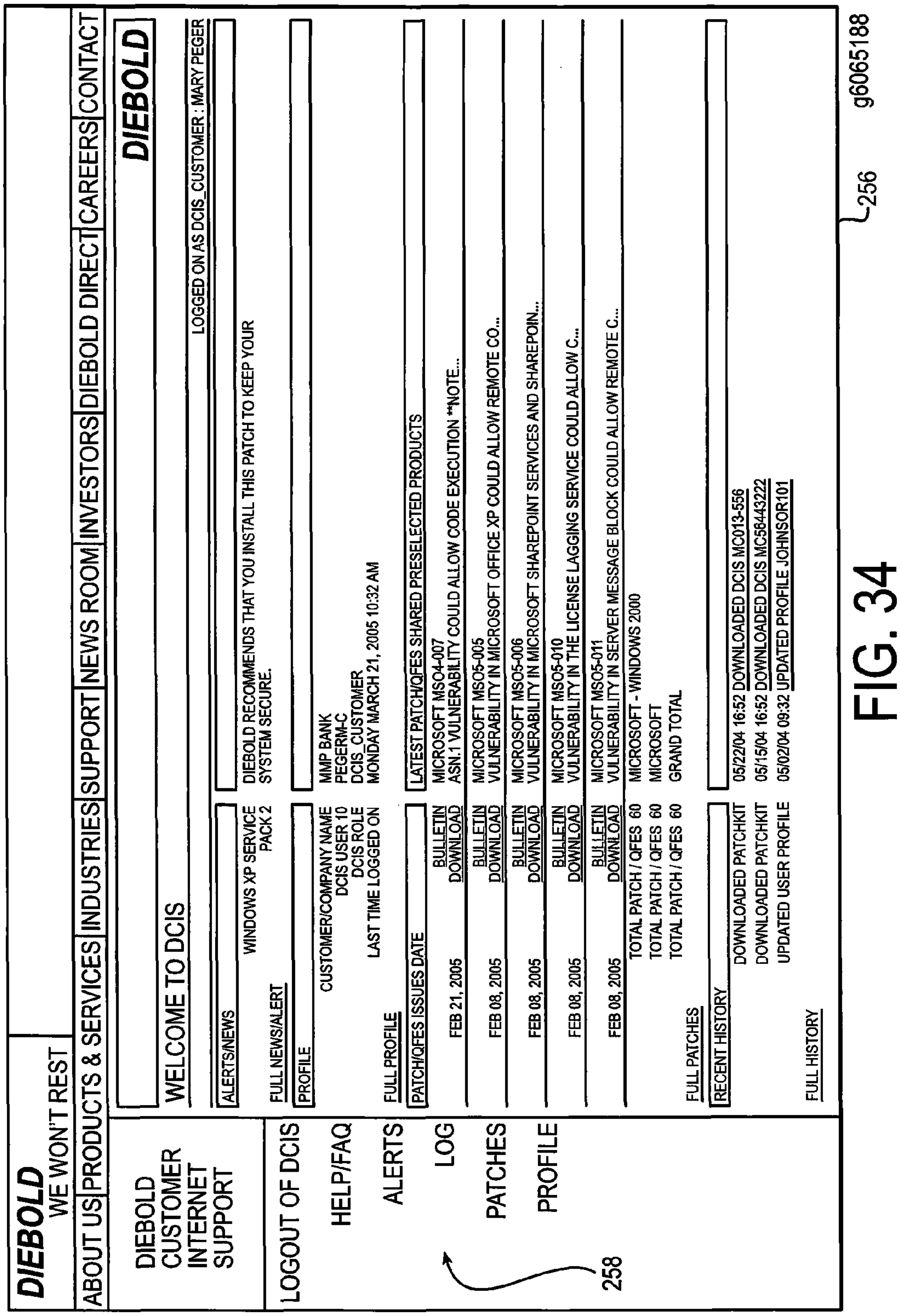
FIG. 34 is a further exemplary display output provided to a registered user of the system.

As shown in FIG. 34 the user is also enabled to select particular categories of information by selecting the links shown to the left in the customer screen. These links are generally indicated 258. Selection of links 258 also provides the user with outputs containing the full information which is available from the system related to the various categories. Of course it should be understood that this approach is exemplary and in other embodiments other or additional categories of information or different structures for the system may be used.

Figure 35:
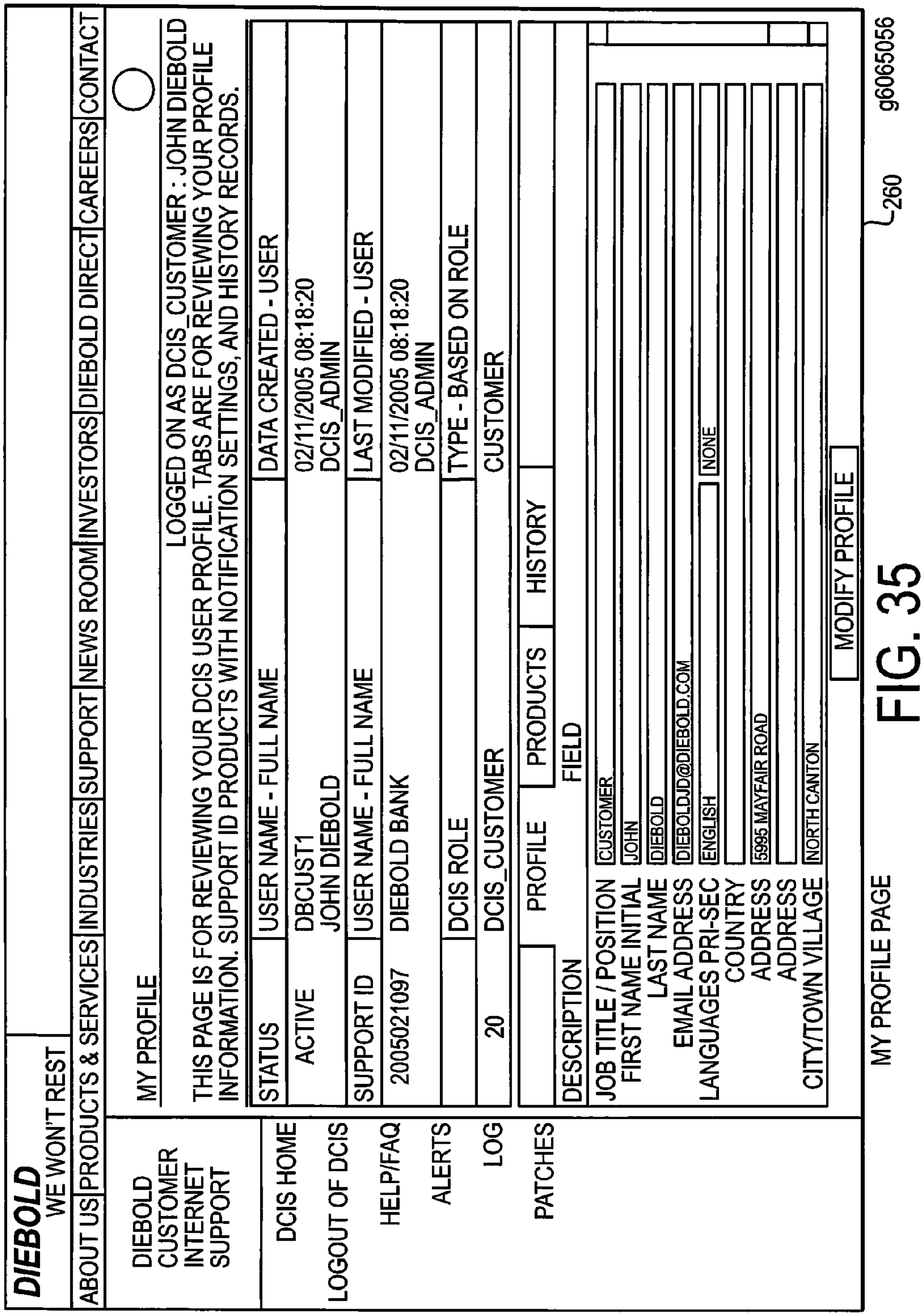
FIG. 35 is a further exemplary display output provided to a registered user of the system.
Figure 36:
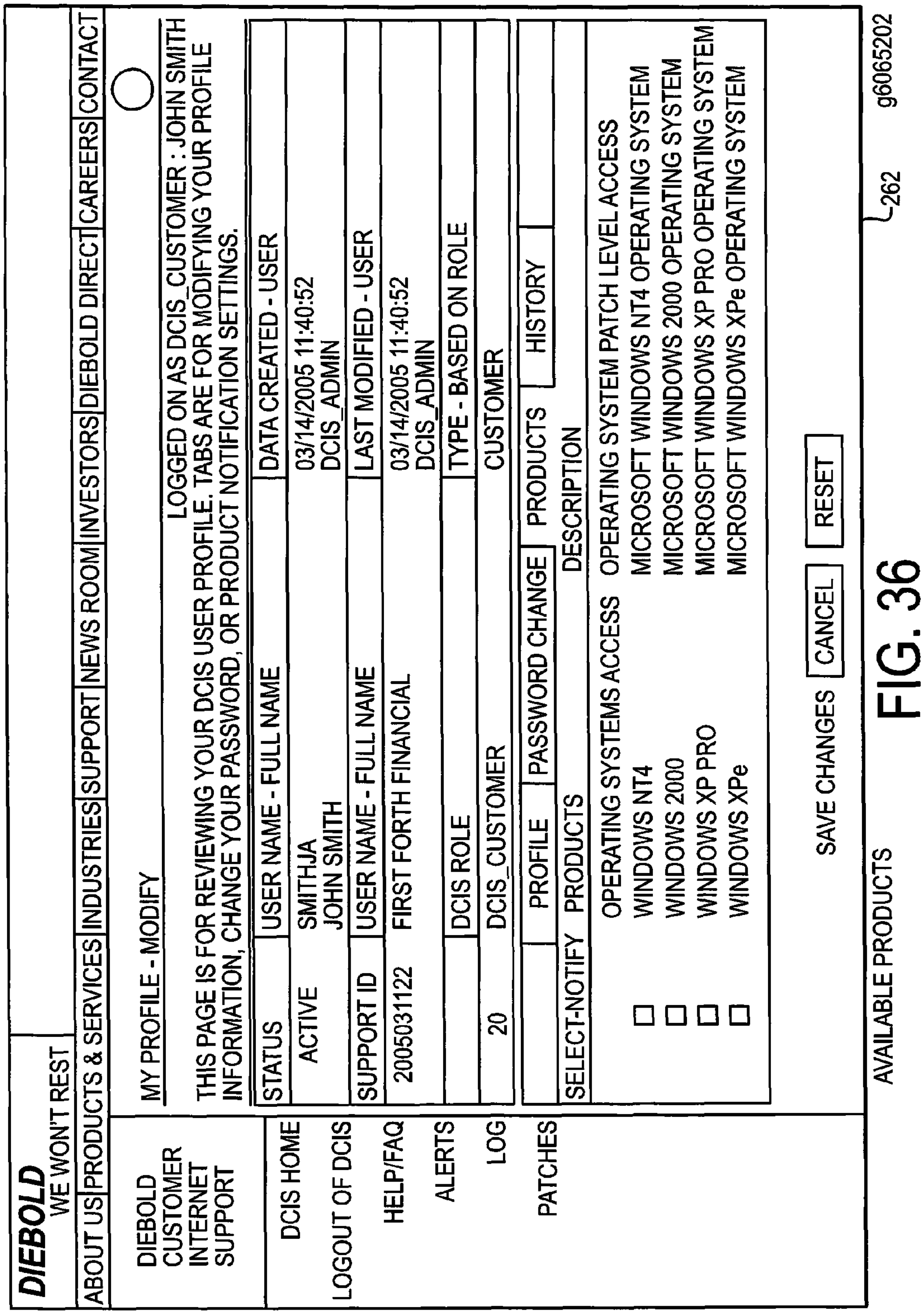
FIG. 36 is a further exemplary display output provided to a registered user of the system.
Figure 37:
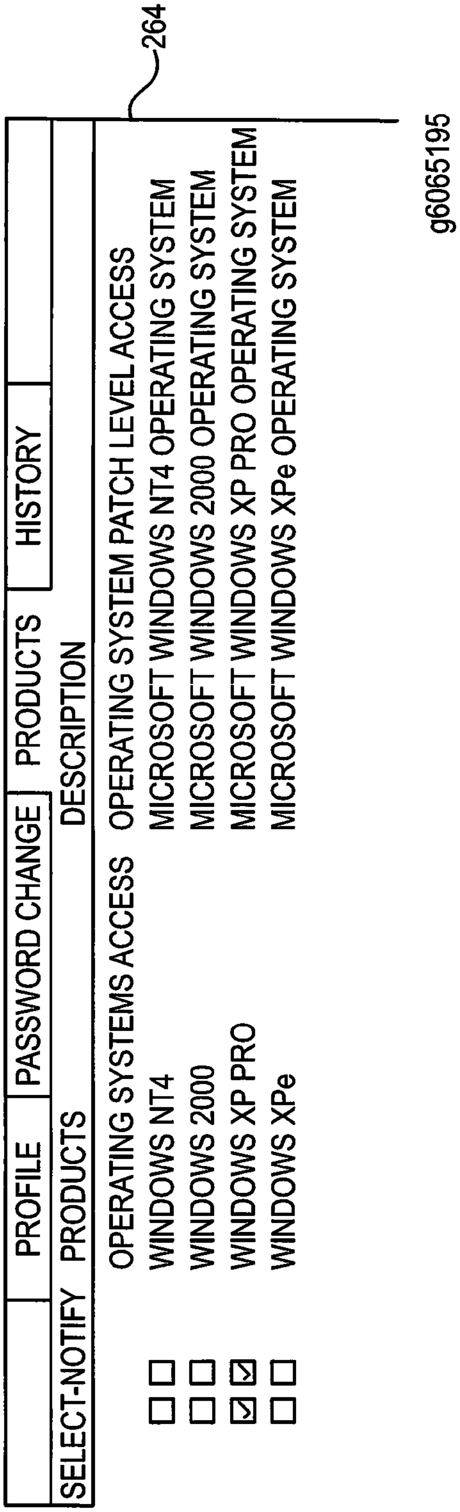
FIG. 37 is a further exemplary display output provided to a registered user of the system.

FIG. 35 shows an exemplary screen 260 which is output from a user workstation in response to the user selecting the profile selection from the home screen 256. This profile information provides the user with information about their access rights, the data stored in the system concerning the user and the products with which the user is associated. As indicated in the lower portion of the screen the user is also enabled to recover historical data related to their user account by selecting the tabs presented in the output screen 260.

If the user selects the modify profile option from the screen 260, the user is presented with outputs which enable the user to change certain of the information. This is represented by screens 262 and 264 shown in FIGS. 36 and 37 respectively. As can be appreciated in some embodiments the user may only be presented with the information which they are authorized by the system to change. In some embodiments only the administrator for the particular entity may be allowed to input or change information. In such embodiments the user may be authorized to review the information but cannot make any changes. If changes are to be made in such embodiments, the modifications would need to be input to the system by the administrator for the entity. Of course other approaches may be used.

In the exemplary embodiment, which produces the output screens 262 and 264, the user is enabled to select certain computer programs in which they have an interest in being able to access particular information. In the exemplary embodiment certain software programs are listed which may be operated in automated banking machines for which the user has operational responsibility. In the exemplary embodiment the user may select to be able to receive information concerning update code items that provide update changes to those computer programs. The user may do this by providing an input that indicates that such a program has been selected. Further in the exemplary embodiment if the user wishes to be notified via e-mail of any new information related to a selected program, they have the option of providing an input to indicate that they wish to be so notified. The information concerning the selections input by the particular user are stored through operation of the at least one computer 66 in the at least one data store 70. As can be appreciated, in the exemplary embodiments a user may be able to select to be able to access information related to numerous different computer programs and other products. The user may also provide inputs so that they are selectively notified by e-mail if there is any new information related to some or all of the products that they have selected. Of course these approaches are exemplary.

Figure 38:
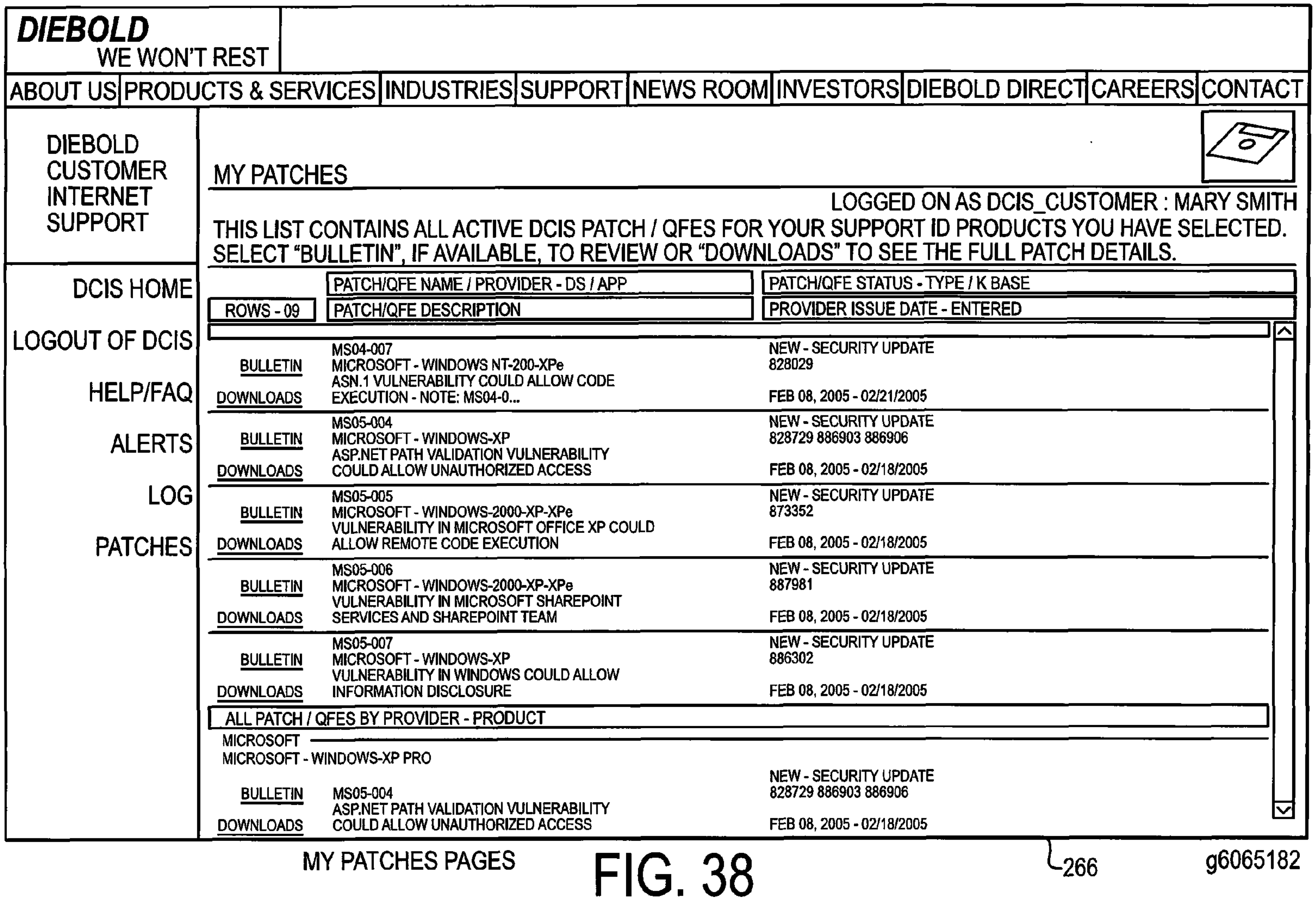
FIG. 38 is a further exemplary display output provided to a registered user of the system.
Figure 39:
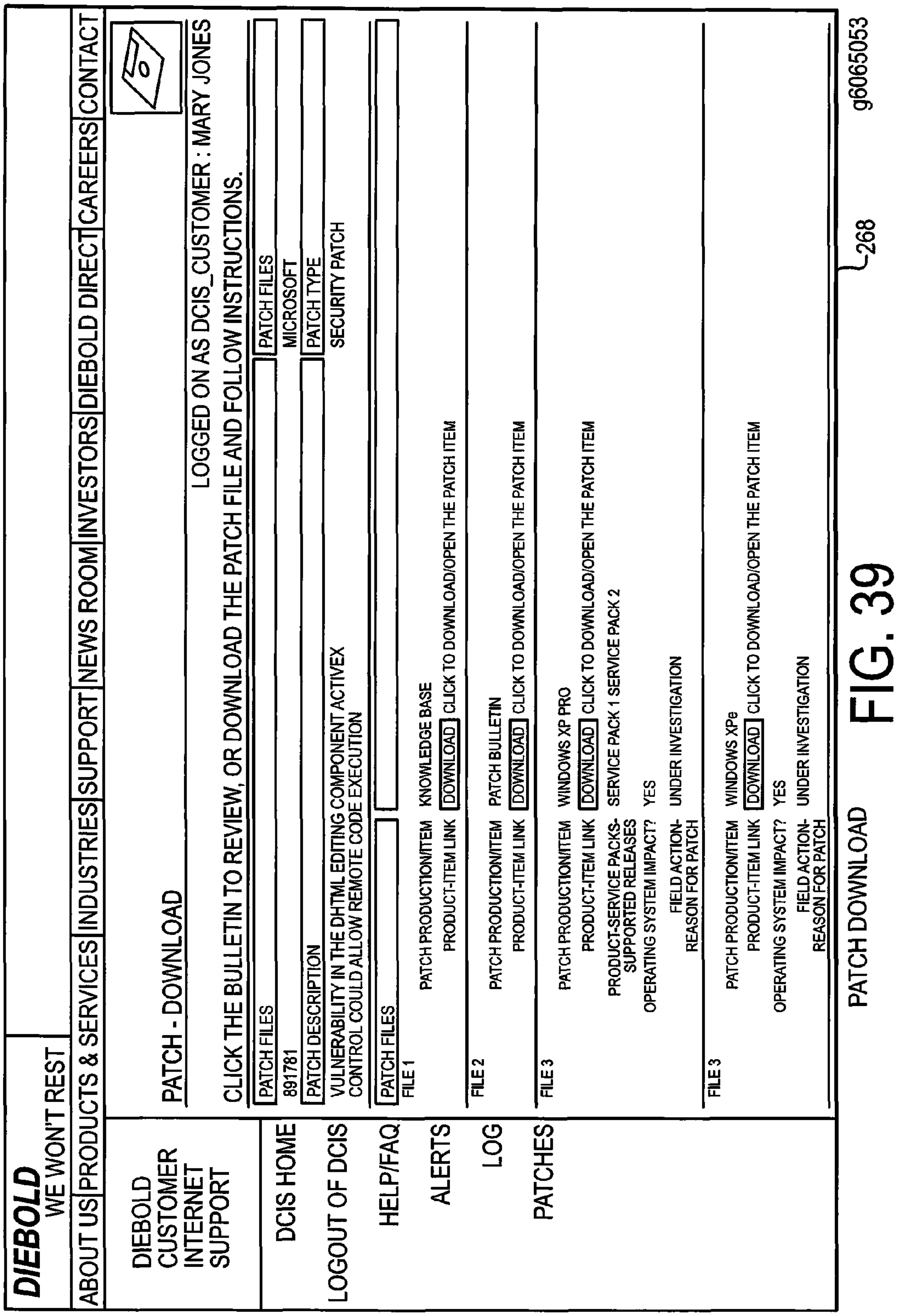
FIG. 39 is a further exemplary display output provided to a registered user of the system.

FIG. 38 shows a screen 266 which is output from a user workstation in response to the user selecting the patches category. In response to this selection, the at least one computer is operative to determine responsive to the programming associated with the at least one processor and the information stored in the at least one data store, the update code items associated with the particular products included in a user's profile. The at least one computer outputs information concerning update code items that are available with such computer programs. In the exemplary embodiment these update code items are presented in the output screen arranged from the most recent to the oldest. Basic information is included concerning these items. In addition in some exemplary embodiments the user is enabled to obtain further information concerning such item. Such information may be accessed by selecting links that provide descriptive information in the database 70. Alternatively or in addition the at least one computer may operate to provide a link to a server accessible in a connected network that can provide additional information that may be requested by the user.

In the exemplary embodiment the user is enabled to select for download particular update code items indicated on the screen 266. When the user has selected such an update code item the system is operative to cause to be output through the user's workstation a screen 268 shown in FIG. 39. Selection of the particular patch may result in the at least one computer providing to the user several different options related to the particular item. This may include for example options to access information related to the item, information related to how to install it, the actual code itself or other computer executable instructions or information that may be useful to the user in receiving, installing or operating the particular update code item. The at least one computer 66 provides this information in accordance with the programming associated with the at least one processor 68 and the data stored in the at least one data store 70. In some embodiments the information may be based on information stored in the data store. Alternatively or in addition the at least one computer 66 may operate to provide links to one or more servers accessible through the at least one network 84. These links enable the particular user to access the items of information, update code items or other items. Of course these approaches are exemplary and it should be understood that although the exemplary embodiment has been discussed in connection with software update code items which may include software patches, the system may also be used to provide other types of items and information.

In an exemplary embodiment the ATM manufacturer who operates the system gathers information concerning computer programs or other items that are used in its ATMs. The ATM manufacturer also determines which available code items, updates or other information may be applicable to the particular products for which information is disseminated through the system and other information concerning the suitability of such items for use in its automated banking machines. Information concerning such update code items or the items themselves are input to the at least one computer 66 through inputs to workstations such as workstations 76, 78 and 80.

Responsive to receiving additional information the at least one computer 66 operates in accordance with the programming associated with the at least one processor 68 to analyze the information stored in the at least one data store 70. An analysis is done to determine the particular authorized users of the system who have selected through their inputs to receive such information because it pertains to the particular computer programs of interest to them. The computer then operates to assure that the information is presented to such users when they next log on to the system.

In addition the at least one computer determines the authorized system users who have input data indicating that they wish to receive notifications concerning any changes to the particular computer programs operated by the entity for which they have operational responsibility and with which they are associated. In the exemplary embodiment the at least one computer 66 resolves the e-mail address information concerning such users and causes to be dispatched through the at least one network 84, e-mail messages to those particular users. In the exemplary embodiment the at least one computer sends to the selected users at their network addresses an e-mail indicating that they have new information available through the DCIS system. In some exemplary embodiments the at least one computer may include in the message a link to a login screen of the DCIS system. Further in other exemplary embodiments the at least one e-mail message may include information concerning the nature of the new information that is available including for example the urgency associated with the information, the type of automated banking machines or software products to which it applies or other information that may be pertinent to the user's reaction to the particular information. Of course these approaches are exemplary.

As can be appreciated in response to receiving such a communication which indicates the availability of information or new update code items, the user may log on to the system and obtain the information and also as appropriate, download update code items or other information from the system. Of course these approaches are exemplary and in other embodiments other approaches may be used to provide a user with information concerning the items for which the user is interested in receiving notifications. Of course as can be appreciated in the exemplary embodiment security measures may be employed for purposes of assuring the integrity of communications in the system. This may be particularly appropriate when the system communicates information to ATMs through servers like servers 108 or 118 described in connection with FIG. 3. As can be appreciated in those exemplary situations, the at least one computer 66 may communicate update code items or other information directly to one or more automated banking machines. In such situations it may be appropriate to use signature data, encryption and/or other methodologies to assure that the automated banking machines are receiving messages from the appropriate source and otherwise to assure that update code items or other information have not been tampered with. Of course as can be appreciated such security measures and signature data to verify the sources of messages may be used in other circumstances as well to achieve appropriate levels of security.

It should be appreciated that the embodiments shown are exemplary and other approaches may be used. For example in other embodiments rather than using one or more central servers a peer-to-peer type system may be used for storing and accessing the distributed information and instructions associated with operation of the system. For example multiple distributed servers in a network may include data corresponding to the entities having operational responsibility for the automated banking machines and the computer programs operated in the banking machines associated with each such entity. In addition such stored data may include distributed information concerning the update code items or other information that is available, and the computer programs operated in automated banking machines to which the update code items apply. Such a distributed processing system may also include data concerning the system addresses from which update code items can be accessed or downloaded.

Further in some exemplary embodiments central or distributed servers may be used to provide records of data related to activities conducted through use of the system. This may include data indicating which update code items have been downloaded by which entities and for which ATM machines. Access may also be provided through various system addresses concerning information about update code items. Other distributed processing systems may store information which is used to give notifications about the availability of information for update code items, as well as store the information to indicate that such notifications have been given. Likewise various forms of distributed data storage may be used to record the information about the license agreements which have been entered into by persons accessing the system and/or persons originally licensing software programs to which the update code items apply. In addition data storage may be provided on a distributed basis for e-mail addresses or other contact information related to authorized users as well as security information and signature data which may be used to verify the source and/or recipient of messages and code items provided by the system.

Of course as can be appreciated whether a system uses central servers and data stores or distributed servers and data stores, provisions may be made for enhancing security through the use of digital certificates and/or other appropriate measures to assure that data is protected and is not accessed by unauthorized persons. In addition certain entities that have operational responsibility for automated banking machines may store certain information on their particular servers that may be accessed through the system by the ATM manufacturer or other entity operating the system as well as third parties. Such third parties may include for example entities responsible for providing service to automated banking machines. Such entities may benefit by knowing that particular update code items have or have not been installed on particular machines. Such information may be recorded and used to analyze particular problems or security vulnerabilities that may be associated with the operation of such automated banking machines. In addition or in the alternative, in some embodiments the entity who has operational responsibility for the machines may include a service provider who is responsible for maintaining the machines or an outsourced machine operator, rather than the owner of the ATMs. Of course these approaches are exemplary.

It should be appreciated that the principles and concepts described may find applicability in numerous types of systems associated with automated banking machines and their operations as well as with regard to other activities. Further it should be understood that the descriptions given are in connection with an exemplary embodiment and are not intended to be in any way limiting with regard to the terminology used or the scope of the claims.

Thus the new automated banking machine system and method of the exemplary embodiments achieve at least some of the above stated objectives, eliminate difficulties encountered in the use of prior devices and systems, solve problems and attain the desirable results described herein.

In the foregoing description certain terms have been used for brevity, clarity and understanding, however no unnecessary limitations are to be implied therefrom because such terms are for descriptive purposes and are intended to be broadly construed. Moreover, the descriptions and illustrations herein are by way of examples and the invention is not limited to the details shown and described.

In the following claims any feature described as a means for performing a function shall be construed as encompassing any means known to be capable of performing the recited function, and shall not be deemed limited to the structures shown in the foregoing description or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

We claim:

1. Apparatus comprising:

at least one computer, wherein the at least one computer is operable to access data from at least one data store, wherein the data links entity contact addresses with programs usable by at least one processor associated with at least one automated banking machine that is each operable to carry out transactions involving financial accounts identifiable at least in part by user data read by at least one machine reader, wherein a first program of the programs includes computer executable instructions that when executed by at least one first processor associated with a first machine of the at least one automated banking machine, causes the first machine to perform at least one first function, wherein the data links the first program with at least a first entity contact address of the entity contact addresses, wherein a second program of the programs includes computer executable instructions that when executed by at least one second processor associated with a second machine of the at least one automated banking machine, causes the second machine to perform at least one second function, wherein the data links the second program with at least a second entity contact address of the entity contact addresses, wherein the at least one computer is configured to operate responsive at least in part to receiving a determination that a first program update is available, to cause at least one first electronic message to be sent to the first entity contact address, wherein the at least one first electronic message indicates that the first program update is available, wherein the at least one computer is configured to operate responsive at least in part to receiving a determination that a second program update is available, to cause at least one second electronic message to be sent to the second entity contact address, wherein the at least one second electronic message indicates that the second program update is available.

2. The apparatus according to claim 1 wherein the first machine includes a cash dispenser, a card reader, and a biometric reader, wherein the at least one first processor is operable during a user transaction session to:

cause card data to be read from a card through operation of the card reader, and then cause the read card data to be compared with card information stored in at least one authorization data store, and cause biometric data to be read through operation of the biometric reader, and then cause the read biometric data to be compared with biometric information in the at least one authorization data store;

wherein the at least one first processor is operable to authorize a machine user to carry out a cash withdrawal transaction that involves operation of the cash dispenser, responsive at least in part to:

computer-determined correspondence between the read card data and the card information, computer-determined correspondence between the read biometric data and the biometric information, and computer-determined correspondence between the read card data and the read biometric data.

3. The apparatus according to claim 1 wherein the first machine includes a card reader, wherein a first program causes operation of the card reader, wherein the second machine includes a cash dispenser, wherein a second program causes operation of the cash dispenser.

4. The apparatus according to claim 1 wherein the data links:

each respective program with at least one machine, each respective machine with a respective entity, and each respective entity with a respective entity contact address, wherein the at least one computer is operable to determine from the at least one data store, which of the entity contact addresses are linked to a respective program.

5. The apparatus according to claim 1 wherein the data links respective updates with respective programs, wherein the data links the first program update with the first program, wherein the data links the second program update with the second program.

6. The apparatus according to claim 5 wherein the at least one computer is operable to determine whether the first program update is available, wherein the at least one computer is operable to determine whether the second program update is available.

7. The apparatus according to claim 1 at least one computer associated with a program update support system, wherein the at least one first electronic message indicates that the first program update can be obtained from the system, wherein the at least one second electronic message indicates that the second program update can be obtained from the system.

8. The apparatus according to claim 7 wherein the at least one computer is operable to cause the first program update to be sent to the first entity contact address, wherein the at least one computer is operable to cause the second program update to be sent to the second entity contact address.

9. The apparatus according to claim 8 wherein the at least one computer comprises a server.

10. Apparatus comprising:

at least one computer including computer executable instructions, wherein the at least one computer is operable to determine that an update is available for a particular program usable by at least one processor associated with at least one automated banking machine that is each operable to carry out transactions involving financial accounts identifiable at least in part by user data read by at least one machine reader, wherein the at least one computer is associated with at least one data store, wherein the at least one data store includes data that associates programs with entities, wherein the data associates the particular program with at least a first entity of the entities, wherein the at least one data store includes data that respectively associates contact information for each respective entity, wherein the at least one data store includes data that associates the first entity with first contact information, wherein the at least one computer is operable to determine from the at least one data store for each respective program, respective contact information for the respective program, wherein the at least one computer is operable to determine from the at least one data store for the particular program, the respective contact information for the particular program, wherein the at least one computer is operable to determine that the respective contact information for the particular program includes the first contact information, wherein the at least one computer is further operable to use the first contact information to cause at least one message to be sent to the first entity, wherein the at least one message provides information regarding:

that the update is available for the particular program, and where the update can be obtained.

11. The apparatus according to claim 10 wherein the particular program is usable by a first processor associated with a first automated banking machine, wherein the first automated banking machine includes a cash dispenser, a card reader, and a biometric reader, wherein the first processor is operable during a user transaction session to:

cause card data to be read from a card through operation of the card reader, and then cause the read card data to be compared with card information stored in at least one authorization data store, and cause biometric data to be read through operation of the biometric reader, and then cause the read biometric data to be compared with biometric information in the at least one authorization data store;

wherein the first processor is operable to authorize a machine user to carry out a cash withdrawal transaction that involves operation of the cash dispenser, responsive at least in part to:

computer-determined correspondence between the read card data and the card information, computer-determined correspondence between the read biometric data and the biometric information, and computer-determined correspondence between the read card data and the read biometric data.

12. The apparatus according to claim 10 wherein the first entity has responsibility for updating the particular program in at least processor associated with at least one automated banking machine, wherein the first contact information comprises electronic address information for the first entity.

13. The apparatus according to claim 12 wherein the at least one computer is associated with a program update support system, wherein the at least one message indicates that the update for the particular program can be obtained from the system.

14. The apparatus according to claim 13 wherein the at least one computer is operable to cause the update to be sent to the first entity.

15. The apparatus according to claim 14 wherein the at least one computer comprises a server.

16. The apparatus according to claim 10 wherein the data links respective updates with respective programs, wherein the data links the update with the particular program.

17. The apparatus according to claim 10 wherein the at least one data store includes data that associates:

each respective program with at least one machine, and each respective machine with a respective entity.

18. Apparatus comprising:

at least one computer including computer executable instructions, wherein the at least one computer is operable to access from at least one data store, data respectively linking control programs with entity contact information, wherein each control program is used by at least one controller of at least one automated banking machine that is operable to carry out transactions involving financial accounts identifiable at least in part by user data read by at least one machine reader, wherein the data allows the at least one computer to determine for each respective control program, the entity contact information for each respective party that is at least partly responsible for controller usage of the respective control program, wherein the at least one computer is operable responsive at least in part to an update for a first control program being available to a first respective party that is at least partly responsible for first controller usage of the first control program, to determine through use of the data, the entity contact information for the first respective party, wherein the at least one computer is further operable responsive at least in part to determining the entity contact information for the first respective party, to cause at least one first electronic message to be sent to the first respective party, wherein the at least one first electronic message indicates:

that an update is available for the first control program, and where the update can be obtained, wherein the at least one computer is operable responsive at least in part to an update for a second control program being available to a second respective party that is at least partly responsible for second controller usage of the second control program, to determine through use of the data, the entity contact information for the second respective party, wherein the at least one computer is further operable responsive at least in part to determining the entity contact information for the second respective party, to cause at least one second electronic message to be sent to the second respective party, wherein the at least one second electronic message indicates:

that an update is available for the second control program, and where the update can be obtained.

19. The apparatus according to claim 18 wherein the first controller is associated with a first automated banking machine, wherein the first automated banking machine includes a cash dispenser, a card reader, and a biometric reader, wherein the first controller is operable during a user transaction session to:

cause card data to be read from a card through operation of the card reader, and then cause the read card data to be compared with card information stored in at least one authorization data store, and cause biometric data to be read through operation of the biometric reader, and then cause the read biometric data to be compared with biometric information in the at least one authorization data store;

wherein the first controller is operable to authorize a machine user to carry out a cash withdrawal transaction that involves operation of the cash dispenser, responsive at least in part to:

computer-determined correspondence between the read card data and the card information, computer-determined correspondence between the read biometric data and the biometric information, and computer-determined correspondence between the read card data and the read biometric data.

20. The apparatus according to claim 18 and further comprising a plurality of automated banking machines, wherein each respective machine is associated with a respective controller that uses a control program that is linked in the at least one data store with entity contact information.

* * * * *